United States Patent
Sansom et al.

(10) Patent No.: US 8,898,715 B2
(45) Date of Patent: Nov. 25, 2014

(54) CONTENT ITEM RECEIVER MODULE AND METHOD

(75) Inventors: Patrick Michael Sansom, London (GB); Ian James Valentine, London (GB)

(73) Assignee: Miniweb Technologies Limited (GB)

(*) Notice: Subject to any disclaimer, the term of this patent is extended or adjusted under 35 U.S.C. 154(b) by 0 days.

(21) Appl. No.: 13/395,645

(22) PCT Filed: Sep. 3, 2010

(86) PCT No.: PCT/GB2010/051462
§ 371 (c)(1),
(2), (4) Date: Sep. 28, 2012

(87) PCT Pub. No.: WO2011/030132
PCT Pub. Date: Mar. 17, 2011

(65) Prior Publication Data
US 2013/0014190 A1 Jan. 10, 2013

(30) Foreign Application Priority Data

| Sep. 10, 2009 | (GB) | 0915885.8 |
| Sep. 10, 2009 | (GB) | 0915886.6 |
| Sep. 10, 2009 | (GB) | 0915887.4 |
| Jul. 29, 2010 | (GB) | 1012754.6 |
| Jul. 29, 2010 | (GB) | 1012755.3 |
| Jul. 29, 2010 | (GB) | 1012756.1 |
| Jul. 29, 2010 | (GB) | 1012757.9 |

(51) Int. Cl.
*H04N 7/173* (2011.01)
*H04N 7/10* (2006.01)
(Continued)

(52) U.S. Cl.
CPC ........ *H04L 65/4084* (2013.01); *H04N 7/17318* (2013.01); *H04N 21/4821* (2013.01); *G06F 17/30828* (2013.01); *H04L 65/4069* (2013.01); *H04L 65/1059* (2013.01); *H04N 21/8586* (2013.01); *H04N 21/4622* (2013.01); *H04N 21/43615* (2013.01); *H04N 21/4722* (2013.01); *H04N 21/4828* (2013.01); *G06F 17/3082* (2013.01)
USPC ............................................ 725/109; 725/32

(58) Field of Classification Search
CPC .................. H04N 21/44222; H04N 21/44543; H04N 21/4126
USPC .............................................. 725/32–34, 109
See application file for complete search history.

(56) References Cited

U.S. PATENT DOCUMENTS

| 6,163,316 A | 12/2000 | Killian |
| 6,910,191 B2 | 6/2005 | Segerberg et al. |

(Continued)

FOREIGN PATENT DOCUMENTS

| EP | 1357734 | 10/2003 |
| EP | 1482735 | 12/2004 |

(Continued)

OTHER PUBLICATIONS

International Search Report issued Jan. 24, 2011 in corresponding PCT/GB10/051462.

*Primary Examiner* — Mark D Featherstone
*Assistant Examiner* — Akshay Doshi
(74) *Attorney, Agent, or Firm* — Pillsbury Winthrop Shaw Pittman LLP

(57) ABSTRACT

The present invention relates to a content item receiver module and method. The content item receiver module is operative for a content item delivery system, configured to operate in a first and second mode: said first mode operative to drive a display apparatus to display a received content item; said second mode operative for a specified time window to display on a display apparatus a sequence of linked content items in said specified time window, each of said linked content items having a duration less than said specified time window, and to respond to a prompt signal to initiate a display option.

38 Claims, 12 Drawing Sheets

Figure 1:
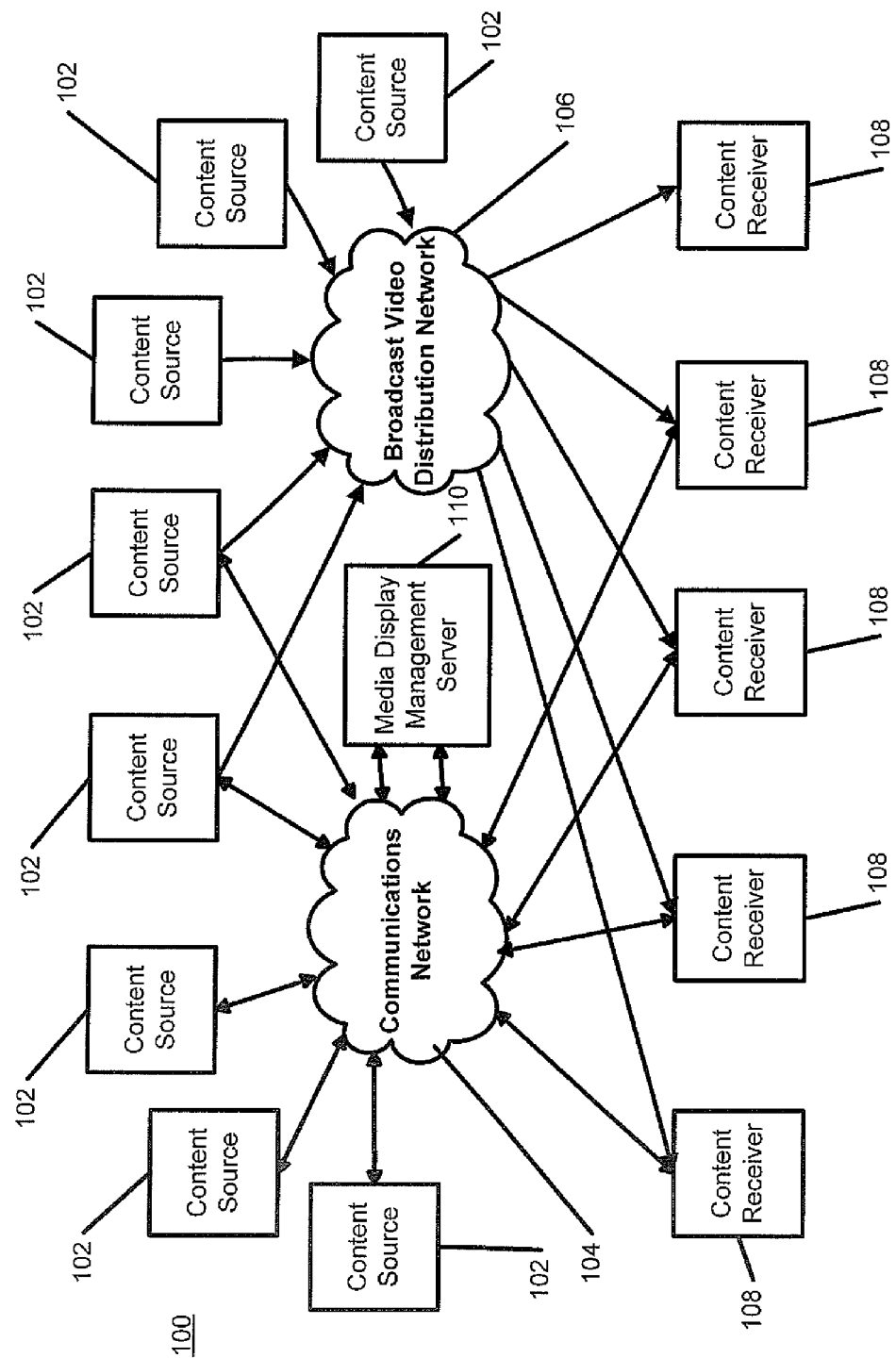

(51) Int. Cl.
*H04N 7/025* (2006.01)
*H04N 21/482* (2011.01)
*G06F 17/30* (2006.01)
*H04N 21/858* (2011.01)
*H04N 21/462* (2011.01)
*H04N 21/436* (2011.01)
*H04N 21/4722* (2011.01)
*H04L 29/06* (2006.01)

(56) References Cited

U.S. PATENT DOCUMENTS

| | | | |
|---|---|---|---|
| 7,134,132 B1* | 11/2006 | Ngo et al. | 725/34 |
| 8,209,713 B1 | 6/2012 | Lai et al. | |
| 8,239,889 B2* | 8/2012 | Wong et al. | 725/23 |
| 8,413,183 B2 | 4/2013 | Kunkel et al. | |
| 2002/0178444 A1 | 11/2002 | Trajkovic et al. | |
| 2003/0001898 A1 | 1/2003 | Bernhardson | |
| 2003/0115595 A1 | 6/2003 | Stevens et al. | |
| 2004/0158858 A1 | 8/2004 | Paxton et al. | |
| 2004/0189873 A1 | 9/2004 | Konig et al. | |
| 2005/0120368 A1 | 6/2005 | Goronzy et al. | |
| 2005/0135793 A1 | 6/2005 | Mindrum | |
| 2005/0273828 A1* | 12/2005 | Barton | 725/90 |
| 2006/0031892 A1 | 2/2006 | Cohen | |
| 2006/0048184 A1 | 3/2006 | Poslinski et al. | |
| 2006/0143665 A1 | 6/2006 | Meek et al. | |
| 2007/0006262 A1 | 1/2007 | Cleron et al. | |
| 2007/0074243 A1 | 3/2007 | Verhaegh et al. | |
| 2007/0101374 A1* | 5/2007 | Sherman et al. | 725/86 |
| 2007/0169148 A1 | 7/2007 | Oddo et al. | |
| 2007/0188655 A1 | 8/2007 | Ohta | |
| 2008/0005068 A1 | 1/2008 | Dumais | |
| 2008/0060027 A1 | 3/2008 | Yang | |
| 2008/0092159 A1 | 4/2008 | Dmitriev et al. | |
| 2008/0181575 A1* | 7/2008 | Girard et al. | 386/83 |
| 2008/0229353 A1* | 9/2008 | Morris et al. | 725/32 |
| 2008/0297669 A1 | 12/2008 | Zalewski et al. | |
| 2008/0307456 A1 | 12/2008 | Beetcher et al. | |
| 2009/0172544 A1 | 7/2009 | Tsui et al. | |
| 2009/0178000 A1 | 7/2009 | Kwon et al. | |
| 2009/0210899 A1* | 8/2009 | Lawrence-Apfelbaum et al. | 725/34 |
| 2009/0222850 A1 | 9/2009 | Darnell | |
| 2010/0238924 A1* | 9/2010 | Liu | 370/390 |
| 2011/0010738 A1 | 1/2011 | Carlsgaard et al. | |
| 2011/0219400 A1 | 9/2011 | Candelore et al. | |

FOREIGN PATENT DOCUMENTS

| | | |
|---|---|---|
| EP | 1531626 | 5/2005 |
| EP | 1594317 | 11/2005 |
| EP | 1819159 | 8/2007 |
| EP | 2001223 | 12/2008 |
| EP | 2164247 | 3/2010 |
| EP | 1487212 | 8/2011 |
| GB | 2424747 | 4/2006 |
| GB | 2452519 | 11/2009 |
| WO | WO 00/78040 | 12/2000 |
| WO | WO 01/24047 | 5/2001 |
| WO | WO 02/39289 | 5/2002 |
| WO | WO 03/042866 | 5/2003 |
| WO | WO 2004/091187 | 10/2004 |
| WO | WO 2005/026869 | 3/2005 |
| WO | WO 2006/066375 | 6/2006 |
| WO | WO 2007/149754 | 12/2007 |
| WO | WO 2008/007274 | 1/2008 |
| WO | WO 2008/070133 | 6/2008 |
| WO | WO 2008/088510 | 7/2008 |
| WO | WO 2009/117009 | 9/2009 |

* cited by examiner

Fig. 6

| Ad. ID | Ad. URI | Local Address | Last shown | Time between displays | Broadcast time restrictions | Users | Expires | Duration | Display Data |
|---|---|---|---|---|---|---|---|---|---|
| Ad. 1 | URI 1 | Address 1 | Never | 2 hours | Between 21:00 & 04:00 | User ID1 | 28/09/10 | 30 secs | ------ |
| Ad. 2 | URI 2 | ------ | Never | 30 minutes | Any time | User ID2 | 31/07/10 | 1 min | ------ |
| Ad. 3 | URI 3 | Address 3 | 23/06/10 at 23:01 hours | 15 minutes | Between 23:00 & 04:00 | User ID3 | 05/09/10 | 30 secs | ------ |
| Ad. 4 | URI 4 | Address 4 | 14/04/10 at 13:01 | 1 day | Between 10:00 & 15:00 | User ID3 | 15/06/10 | 30 secs | ------ |
| Ad. 4 | URI 4 | Address 4 | Never | 1 day | Between 10:00 & 15:00 | User ID1 | 15/06/10 | 30 secs | ------ |
| Ad. 5 | URI 5 | Address 5 | 15/05/10 at 15:17 hours | 1 hour | Any time | User ID1 | 23/08/10 | 3 mins | ------ |
| ------ | ------ | ------ | ------ | ------ | ------ | ------ | ------ | ------ | ------ |
| Ad. n | URI n | Address n | Never | 1 week | Between 21:00 & 04:00 | User ID2 | 31/05/10 | 30 secs | ------ |

700

702

CONTENT ITEM RECEIVER MODULE AND METHOD

CROSS-REFERENCE TO RELATED APPLICATIONS

The present application is the U.S. National Stage Application (filed under 35 U.S.C. 371) of prior International Application No. PCT/GB2010/051462, filed Sep. 3, 2010, and published on Mar. 17, 2011 as WO 2011/030132, which claims priority to GB 0915885.8, GB 0915886.6, GB 0915887.4, all filed on Sep. 10, 2009, GB 1012757.9, GB 1012756.1, GB 1012755.3, and GB 1012754.6, all filed on Jul. 29, 2010, the contents of which are incorporated herein by reference in their entirety.

FIELD

The present invention relates to a content item receiver module and method. In particular, but not exclusively, to a content item receiver module and method for a content item delivery system.

BACKGROUND

The distribution of media content such as music and video now takes place over various communications channels. For example, music and video may be broadcast over terrestrial VHF and UHF networks to be received by television sets, from satellite to ground stations or domestic satellite receivers and over cable networks. Such broadcast services generally comprise one or more communication channels, each channel comprising a particular carrier frequency onto which is modulated a signal representative of the content to be transmitted over the channel. Content, typically television programmes, films or music shows, are transmitted over a particular channel or channels at particular times in accordance with a programme schedule. In this regard, broadcast services comprise "appointments to view" whereby a viewer has to tune into a channel at the time content of interest to the viewer is transmitted on that channel.

More recently, interactive television has become available whereby a viewer, prompted by a message displayed on the television, may send control signals or messages to the broadcaster or third party associated with the broadcaster and displayed message to initiate certain activity. For example, to initiate selection of a programme to view or receive information about a programme.

Broadcast services are widely available using digital communications techniques. Digital broadcast service providers often provide data to populate a menu or Electronic Programme Guide (EPG) of, for example, a set-top box or television with suitable EPG software, on one of their channels. A typical EPG is based on a grid system and displays programmes and channels in transverse directions. For example, the programmes for a particular channel may be displayed in a horizontal direction with different channels set out in a vertical direction. A viewer may use a remote control having "UP/DOWN" and "LEFT/RIGHT" buttons and use these buttons to move a cursor about the display to highlight programmes. A viewer may select a highlighted programme by actuating a "SELECT" button which tunes the receiver to the particular cannel. Optionally, a viewer may highlight a programme which is to be broadcast in the future and selection of that programme may invoke a "record" or "reminder" option.

Television viewers are generally familiar with EPGs set out in a grid system and navigable using remote control devices having relatively simple buttons such as "UP/DOWN" and "LEFT/RIGHT" buttons and "SELECT" buttons.

Content is also available over computer networks such as the Internet. Content is usually accessed over the Internet using a personal computer such as a desktop or laptop computer. The location of content on a network such as the Internet is defined by a network address known as a Uniform Resource Locator (URL). A particular content item can be addressed and downloaded to the computer addressing the content for later presentation or may be "streamed" whereby the computer presents the content as it is provided over the network. The user interface for a computer is generally a pointing device such as a "mouse", and computer users are familiar with a user interface which allows for the pointing device to be moved on to an icon, text (such as an Internet "link") or other graphic displayed on a display and selecting that graphic to invoke a function associated with the graphic, for example accessing content over the Internet.

Many communications networks, including those making up at least a part of the Internet, are configured to transmit large amounts of data and these are sometime termed "broadband" networks. For the purpose of this description the term "broadband network" is used to refer to a communications network or part thereof which is capable of transmitting content items such as video and music in an acceptable timeframe. Such networks may also support music or video streaming. The data bandwidth capability of a consumer connection to such a network is typically at least 2 MBit/s.

Many computer users have computers which are part of a local area network (LAN), for example in their workplace and increasingly at home in their domestic residence. Users often keep content items on memory storage coupled to their LAN and accessed through their computers.

A consequence of users having a plurality of different sources of information and becoming used to being able to choose what they wish to access or view is that users have become impatient when presented with information they do not wish to view, for example advertisements. In the broadcast environment many channels have commercial breaks in their programming. Such commercial breaks may be paid for advertising by companies wishing to promote their products or services, or maybe by the broadcaster themselves promoting upcoming services or programmes. Users may wish to avoid such unwanted viewing, but in live broadcast must either switch channels and hope to go to a channel without a current commercial break or go and do something else. Conversely, broadcasters (on behalf of their advertisers or themselves) wish to retain the viewer through the commercial break.

Furthermore, users are used to being able to easily obtain more information about something they are viewing should they wish to.

Aspects and embodiments of the present invention were devised with the foregoing in mind.

Viewed from a first aspect there is provided a content item receiver module operative for a content item delivery system, configured to operate in a first and second mode in which in the first mode it is operative to drive a display apparatus to display a received content item; and in the second mode it is operative for a specified time window to display on a display apparatus a sequence of linked content items in the specified time window, each of the linked content items having a duration less than the specified time window, and it is operative to respond to a prompt signal to initiate a display option.

Viewed from a second aspect there is provided a method of operating a content item receiver, the method comprising in a first mode driving a display apparatus to display a received content item and in a second mode driving for a specified time window the display apparatus to display a sequence of linked content items in the specified time window, each of the linked content items having a duration less than the specified time window, and to respond to a prompt signal to initiate a display option.

The content item receiver module may be further configured to operate in the second mode to respond to the prompt signal to initiate display on the display apparatus of a long form content item associated with one or more linked content items of the sequence the long form content item having a greater duration than at least one of the associated linked content items. In this way, a user may go to a content item which provides more detailed information about the subject.

Optionally, the content item receiver module may be further configured to operate in the second mode to respond to the prompt signal to initiate display on the display apparatus of a menu of one or more display options, the menu comprising at least one of a content item identifier corresponding to a content item and a further display option; and initiate display on the display apparatus of the content item or the further display option responsive to user selection thereof. In this way, a user may select from a plurality of options what they would like to have information about.

The further display option may comprise at least one long form content item identifier corresponding to a long form content item and/or a yet further display option in order to provide the user with a further information or options. In this way, a user may investigate and continue into more detail regarding a content item of interest to them. The yet further display option may include a further long form content item identifier selectable to display a further long form content item, thereby providing a user with new or more detailed information The long form content item and/or the further long form content item may include subject-matter related to the subject-matter of the associated one or more linked content items of said sequence of linked content items, thereby providing a user with an opportunity to obtain more information about the content items that have been displayed to them.

The included subject-matter may be related to the subject-matter of a linked content item displayed on the display apparatus when the prompt signal is initiated. Thus, a user may go direct from a content item they are viewing to content item having more detailed information about the previously viewed content item. Typically, the further long form content item includes subject-matter related to the subject matter of the long form content item.

Suitably, the one or more display options and/or the further display option is associated with one or more linked content items of the sequence of linked content items thereby presenting the user with the opportunity to view content having more information about what was to be displayed in the specified time window.

Typically, the content item receiver module may be further configured to initiate display on the display apparatus of a first linked content item of the sequence of linked content items responsive to initiation of the specified time window, for example where the specified time window is for a commercial break and the linked content items comprise perspective thirty second advertisements.

The content item receiver module may be further configured to be responsive to a user generated prompt signal to initiate display of the one or more display options thereby providing the user with the opportunity to control whether or not they are presented with display options. Optionally, the content item receiver module may be further configured to be responsive to a prompt signal generated automatically responsive to initiation of said specified time window such that the display options are automatically invoked.

Typically, the display of the one or more display options are superimposed over a currently displayed content item. In particular, they may be partially transparently superimposed over the display options.

Suitably, respective ones of the display options comprise an image representative of a respective display option thereby providing a future representation to the user regarding what further information or display options may be provided.

A selected long form or further long form content item may be truncated in order to finish display of the selected long form or further long form content item coincident with a finish of the specified time window. In this way, the long form or further long form content items may be forced to fit into the specified time window.

Optionally, a viewer may be prompted to select an option to continue display of a selected long form or further long form content item beyond a finish of the specified time window.

A long form content item and/or further long form content item may be retrieved from a local store. Such a configuration reduces bandwidth requirements and avoids delaying retrieval due to bandwidth constraints thereby providing the possibility of more quickly supplying such long form or further long form content items. Optionally or additionally network location information may be retrieved from a local store for the long form content item or the further long form content. Typically, the network location information comprises a uniform resource locator (url).

Optionally or additionally the long form content item and/or said further long form content item may be requested and retrieved from a source located on a network and the long form content item and/or the further long form content item stored local to said content item receiver module.

Optionally or additionally, network location information may be requested and retrieved from a source located on a network and stored local to the content item receiver module.

Figure 2:
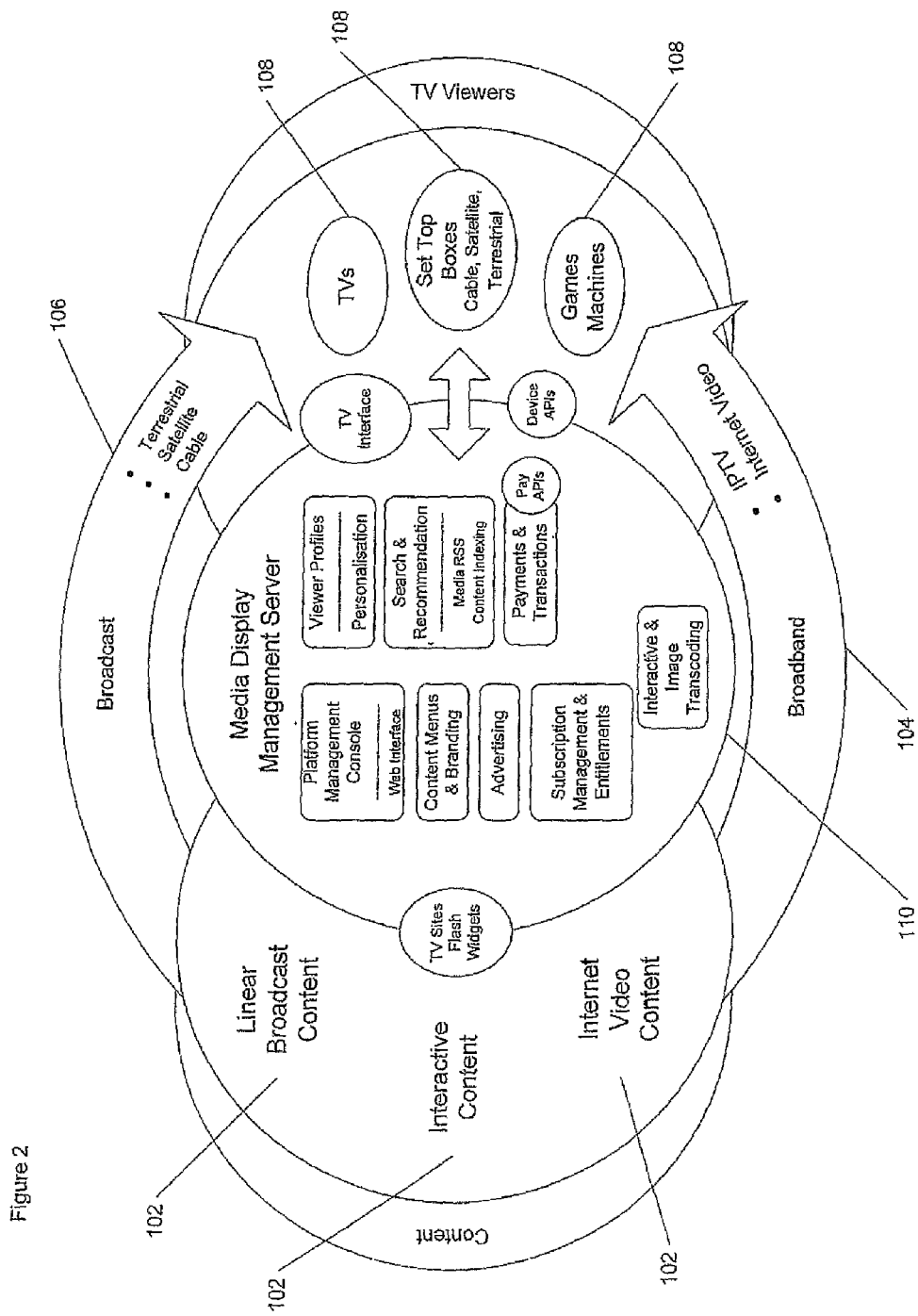
Figure 3:
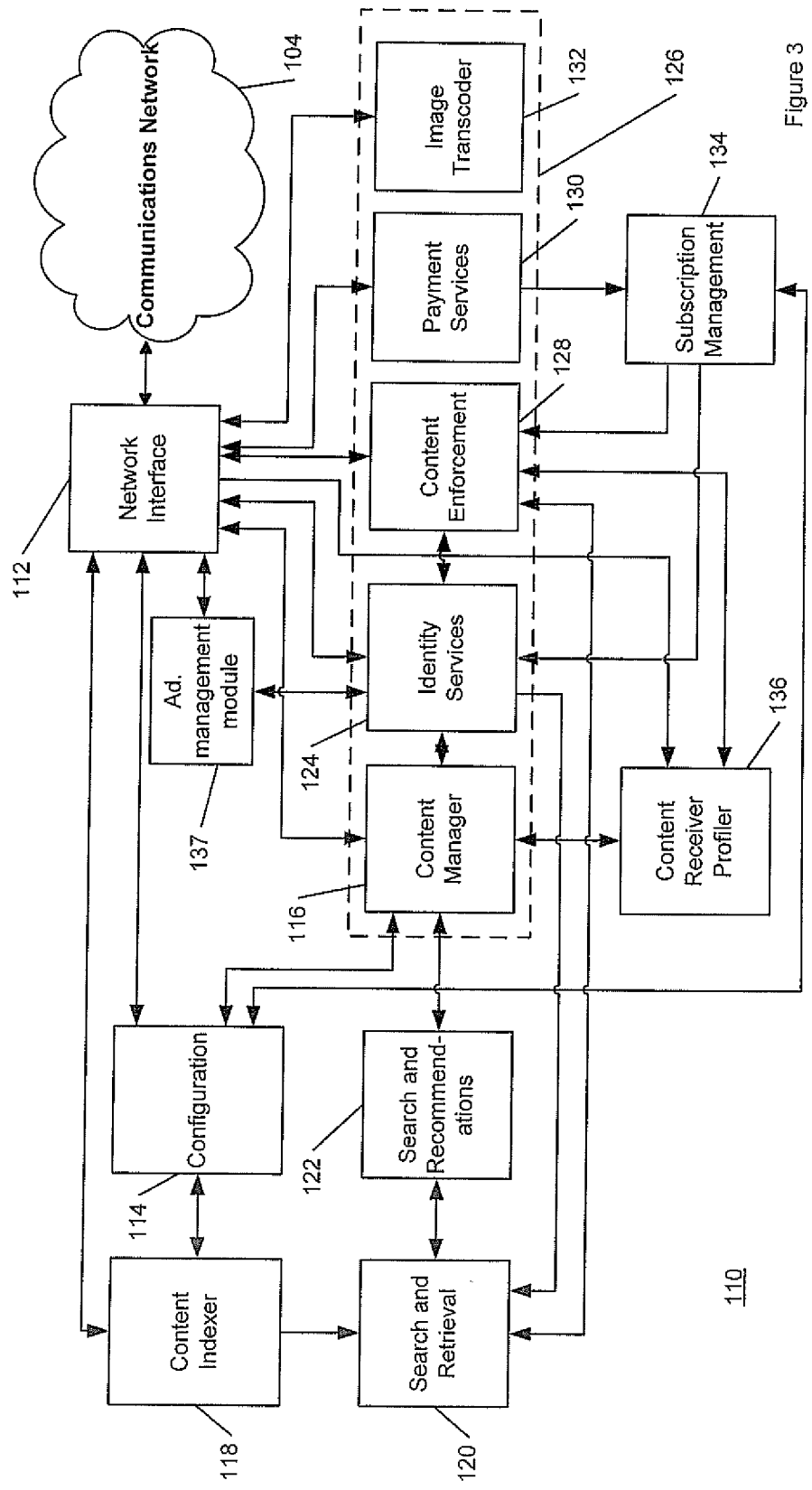
Figure 4:
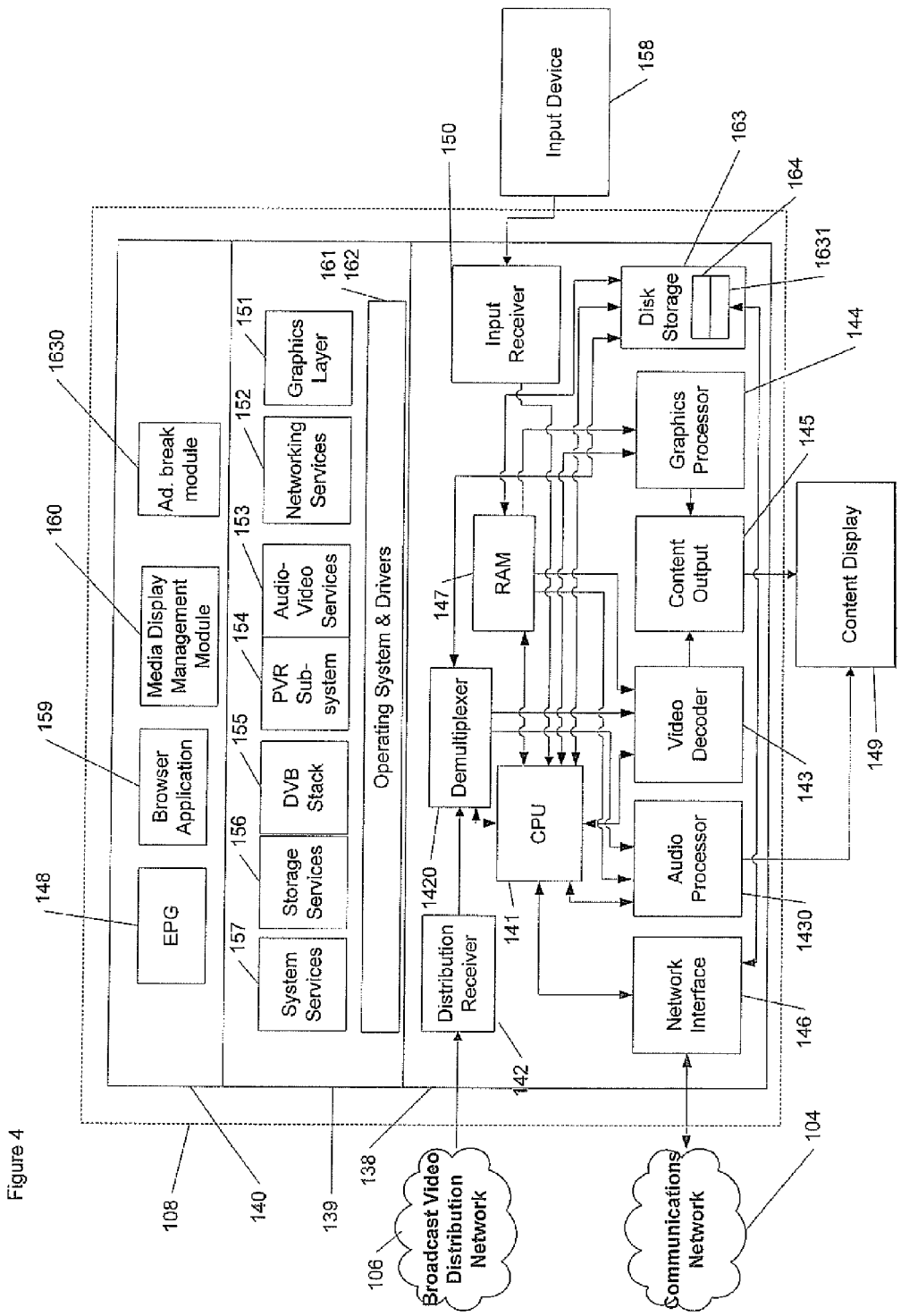
Figure 5:
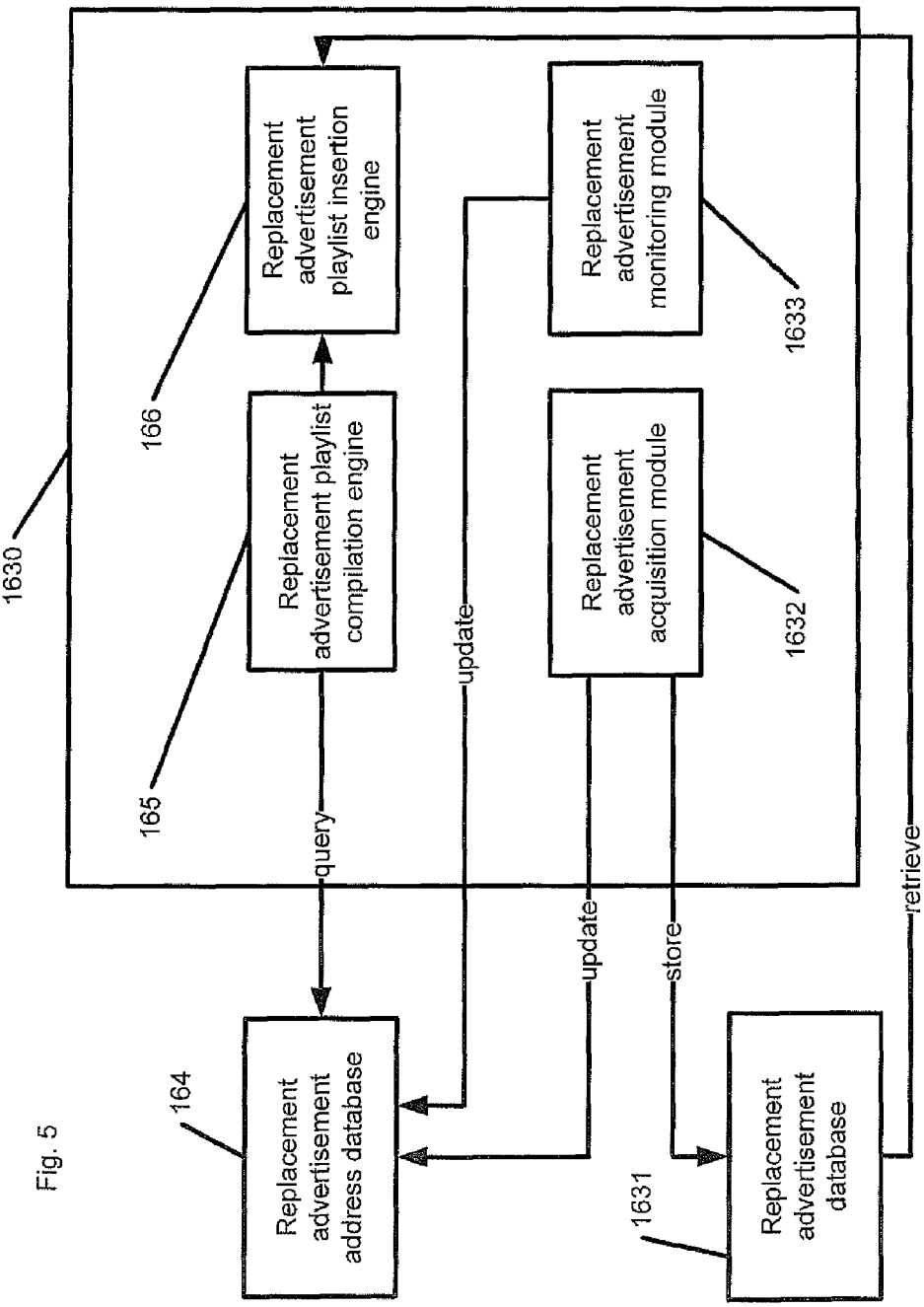
Figure 7:
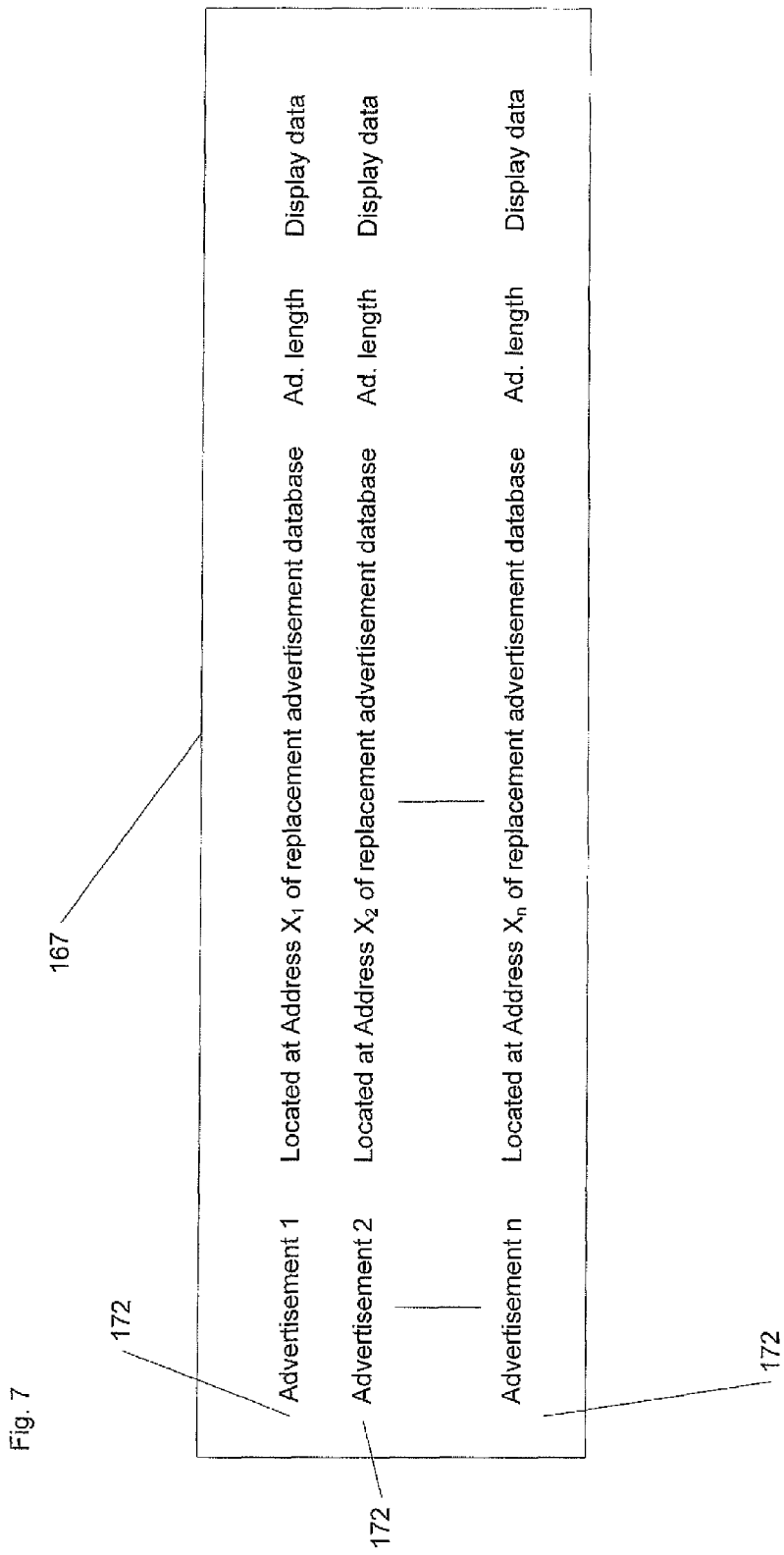
Figure 8:
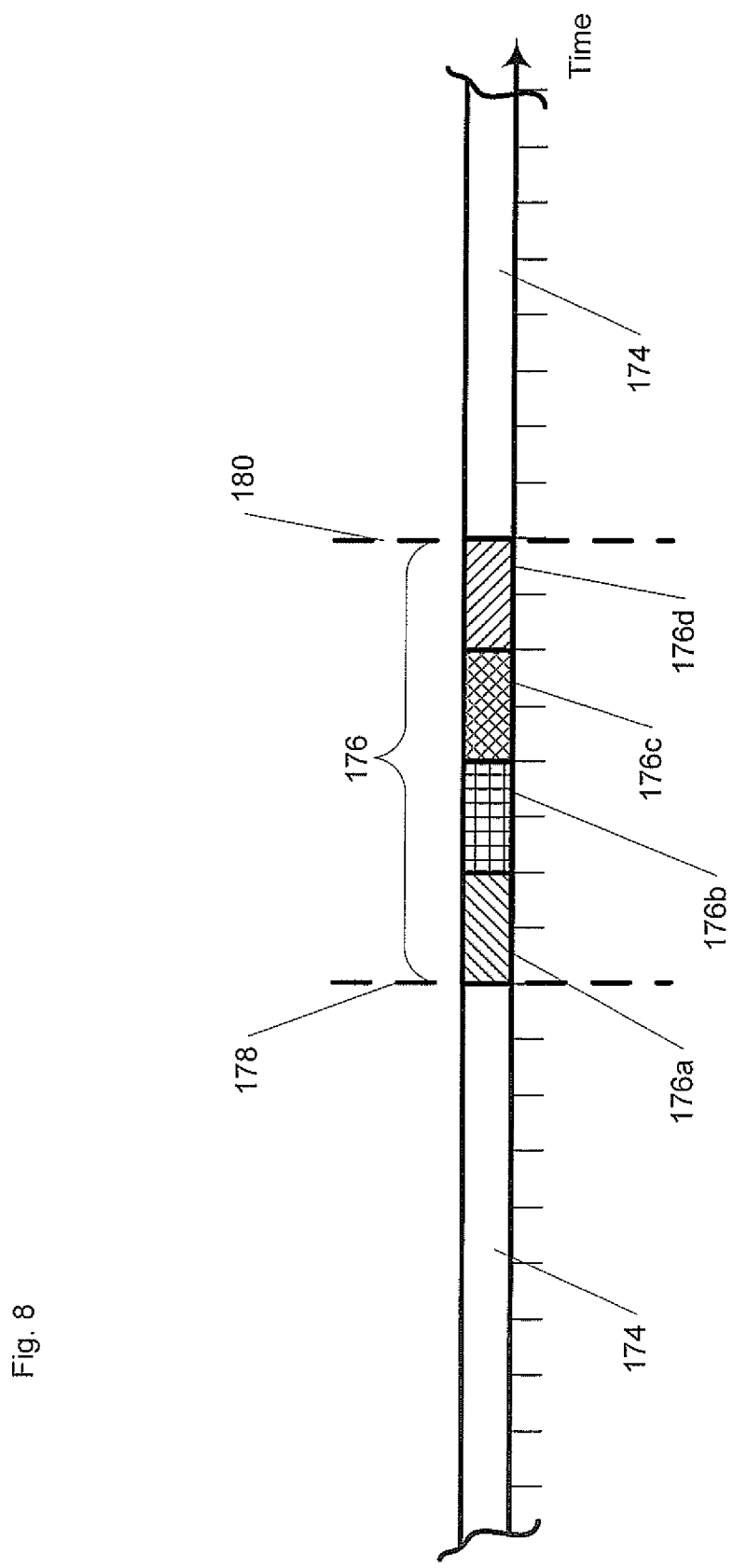
Figure 9:
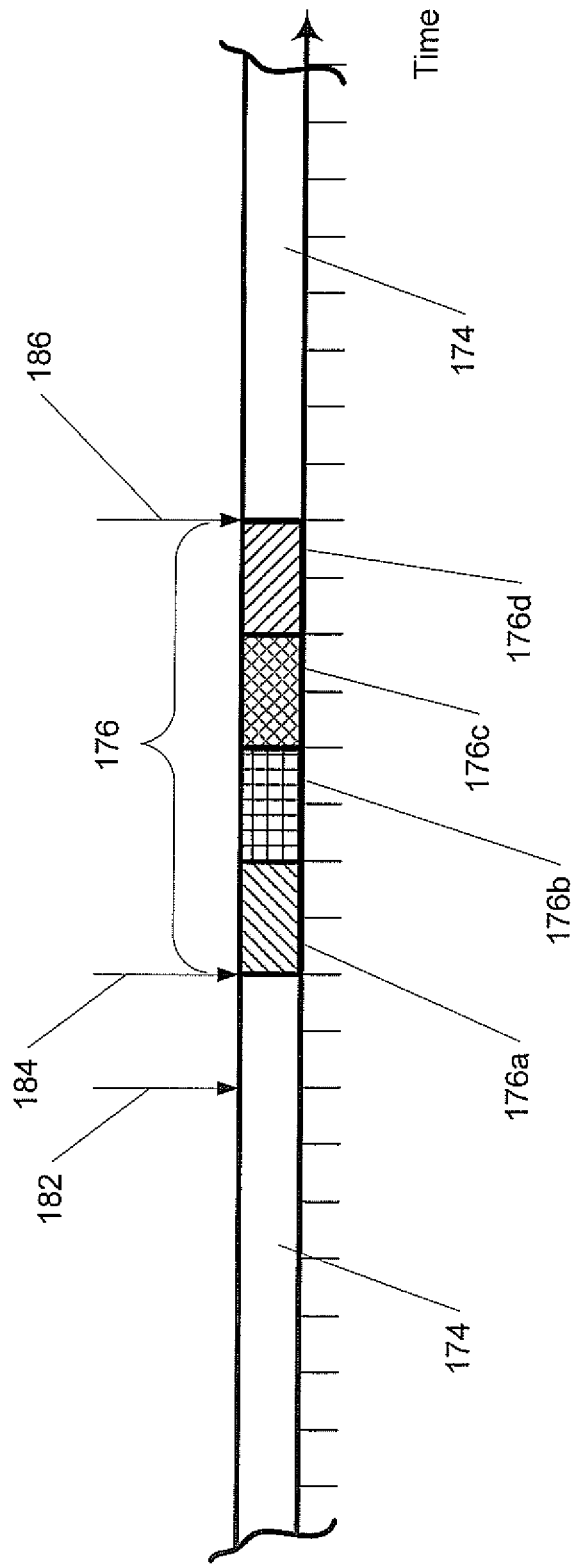
Figure 10:
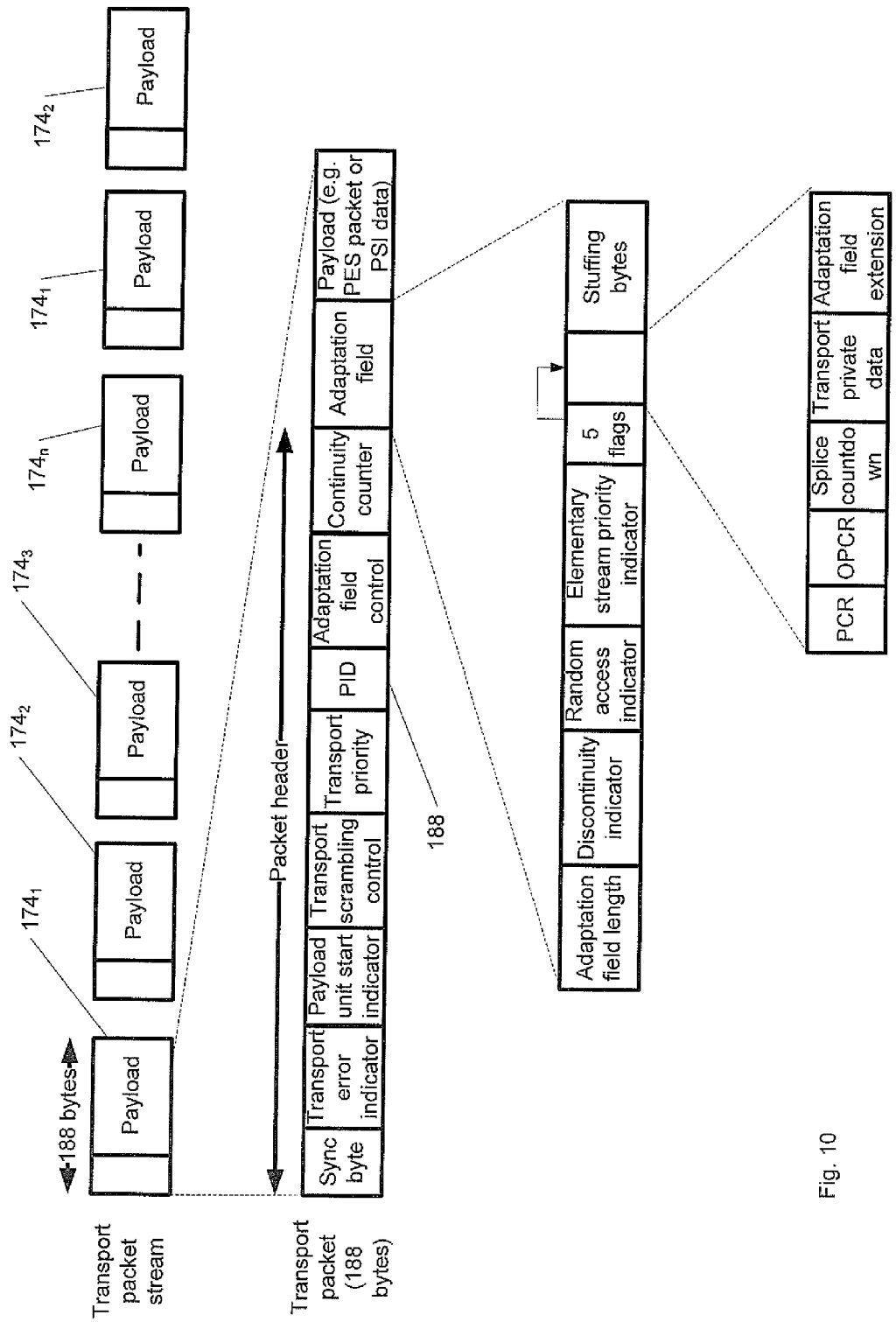
Figure 11:
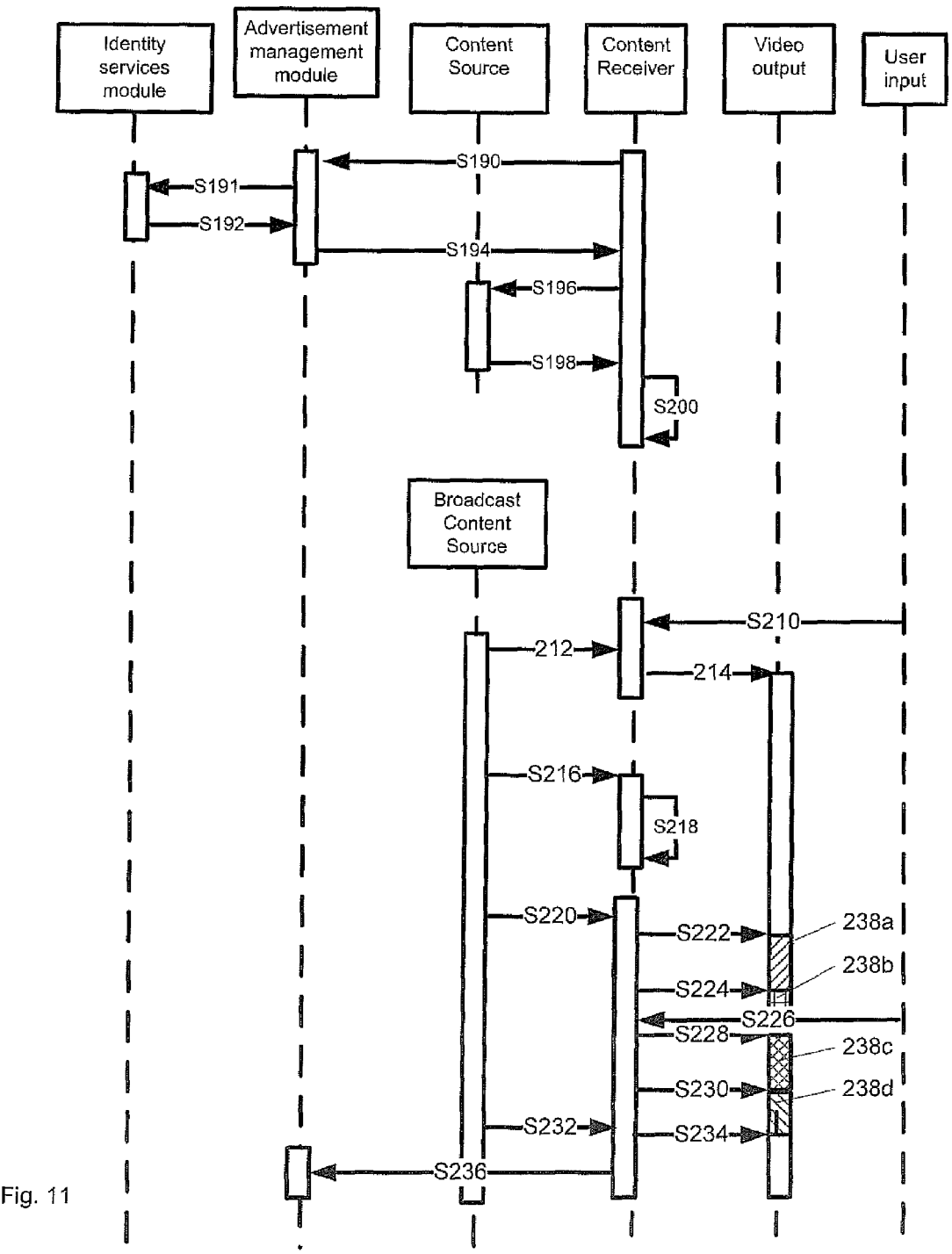
Figure 12:
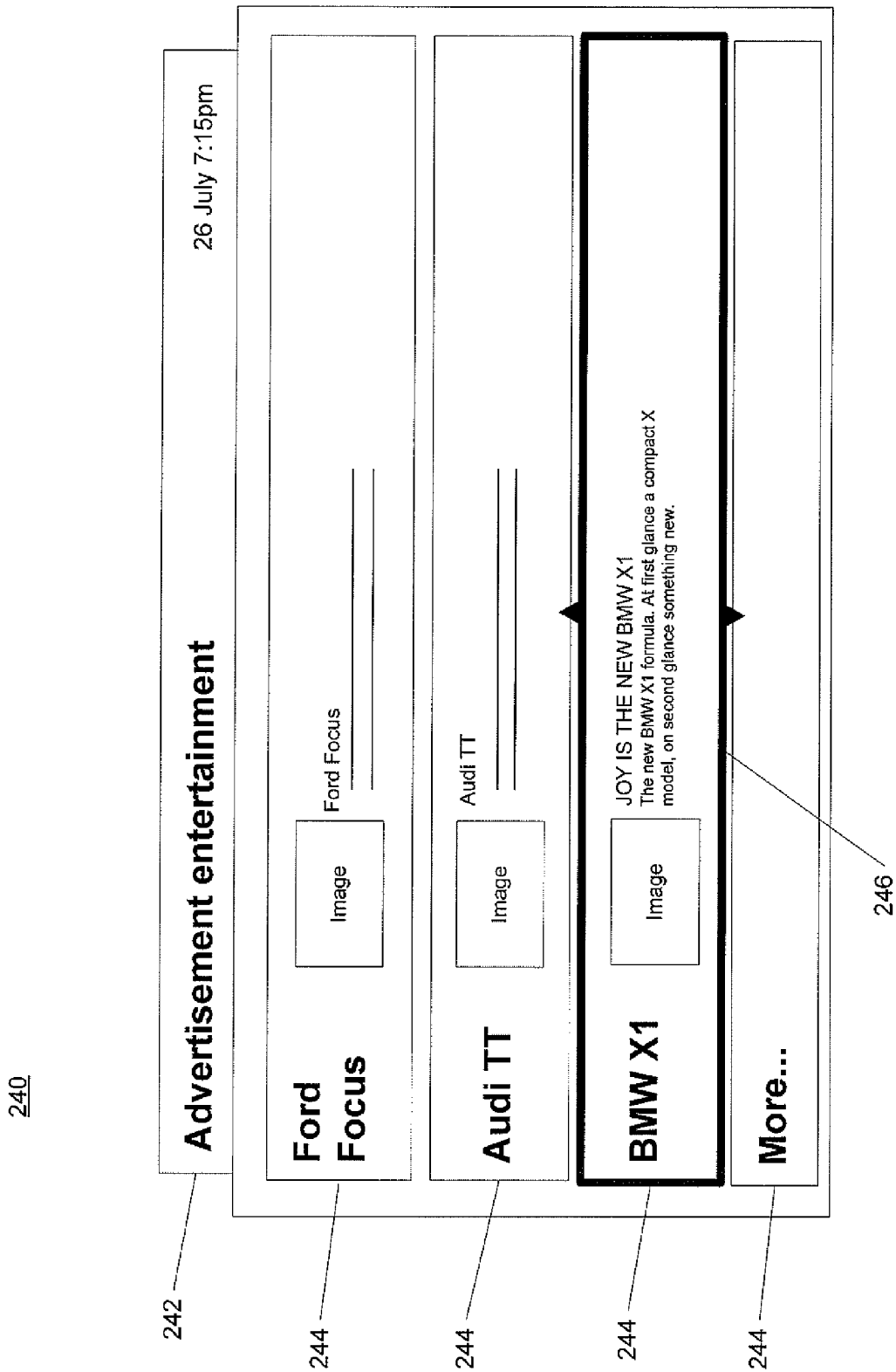

One or more embodiments of the present invention are described further hereinafter, by way of example only, with reference to the accompanying drawings in which:

FIG. 1 schematically illustrates components and communication links of a system for providing access to content from a plurality of sources in accordance with an embodiment of the invention;

FIG. 2 schematically illustrates the system of FIG. 1 in more detail;

FIG. 3 schematically illustrates a media display management server and components thereof in accordance with an embodiment of the invention;

FIG. 4 schematically illustrates a content receiver and components thereof in accordance with an embodiment of the invention;

FIG. 5 schematically illustrates an advertisement break module of a content receiver;

FIG. 6 schematically illustrates replacement advertisement content item data sets stored in a replacement advertisement database;

FIG. 7 schematically illustrates a playlist descriptor;

FIG. 8 schematically illustrates a conventional broadcast transport stream;

FIG. 9 schematically illustrates a modified broadcast transport stream;

FIG. 10 illustrates, in schematic form, an exploded view of an MPEG 2 transport packet stream;

FIG. 11 illustrates a sequence diagram showing steps for insertion of alternative video content, e.g. replacement advertisement content items, into a broadcast stream received at a content receiver to replace content items in the stream with replacement content items; and FIG. 12 illustrates a screenshot of a screen displayed when a replacement advertisement content item menu is invoked by a content receiver in response to instructions input thereto by a user.

A detailed description of one or more embodiments of the invention follows with reference to the figures provided.

FIG. 1 schematically illustrates components and communication links of a system 100 for providing access from one or more content receivers to content from a plurality of sources. Content may comprise one or more content items, and a content item may be a part or whole of programming content (e.g. a television programme, a film, a video clip, an advertisement, and a system information message).

The system 100 comprises a plurality of content sources 102 arranged to provide content for reception by a plurality of content receivers 108 (e.g. set-top boxes) and subsequent viewing of the content on a display associated with the respective receivers 108 over at least one of a communications network 104 (such as: a wide area network (WAN), e.g. the Internet; local area networks (LAN); or a combination of two or more such networks) and a broadcast video distribution network 106 (e.g. a terrestrial cable IPTV or satellite television broadcast system). The system 100 also comprises a media display management server (MDMS) 110 which controls content configuration and distribution of content to the content receivers 108 and provides a content search and/or discovery and/or navigation module and other services. The MDMS 110 provides a content management environment responsible for the presentation of the content accessed by content receivers 108 (or users thereof) registered with the MDMS 110, giving users a consistent, quality controlled, user interface experience across multiple content types such as broadcast TV, interactive content, and Internet video content.

A media display management module (not shown) is provided in the content receivers 108 for managing the content search, discovery, navigation and presentation on the content receivers 108. The media display management module is configured to communicate with the MDMS 110 over the communications network 104.

The MDMS 110 and the media display management module configure content for display based upon a set of parameters specified by one or more of: a content provider; a user of a content receiver 108; a content receiver 108 manufacturer; and a service provider. The parameters may be embedded as operating parameters of a content receiver 108.

FIG. 2 schematically illustrates the features of FIG. 1 in more detail and provides an overview of the functional elements and modules of the MDMS 110. The features illustrated in FIG. 2 which correspond to features already described in relation to FIG. 1 are denoted by like reference numerals.

In the illustrated embodiment, the MDMS 110 offers a client-server relationship with content receivers 108 comprising TV devices (such as set-top boxes), or as a web service via device Application Programming Interfaces (APIs) to TV devices and other systems. Content receivers 108 comprising TV devices that connect to the MDMS 110 may have embedded in them a content receiver specific client (e.g. media display management module) that enables at least a portion of platform services of the MDMS 110 and content owner and original equipment manufacturer (OEM) branding, i.e. branding for the content receiver, manufacturer or supplier, to be maintained uniformly across device types. Once ported, code changes may not need to be made to the device software to add additional content, features and branding.

For content receivers 108 that connect to the MDMS 110 and which do not have embedded client software, the platform services and content can be enabled via direct services application program interfaces and a TV device user interface. In these instances, a sub-set of the full platform functionality may be used, and content owner and OEM configured branding and services may not be fully-reflected in the interface displayed to the user because of the limitations thereof. However, certain minimal elements may be required to be supported as a condition of utilising the APIs.

Internet video traffic delivered to TV devices does not pass through the MDMS 110, but utilises the direct streaming services, protocols, codecs and networking paths from the content owners to the TV devices. While these services, protocols, codecs and the networks utilised are common to Internet video streaming to PCs, TV receivers may only be capable of processing a subset of these protocols and codecs.

Likewise, broadcast content delivered to TV devices does not pass through the MDMS 110 either, but is subject to broadcasting protocols and transmission paths common to broadcast of TV signals to TV devices over suitable media (e.g. Satellite, Antenna, and Cable).

Using the MDMS 110, content owners and media aggregators (i.e. parties who aggregate syndicated web content such as news headlines, weblogs (blogs), podcasts, vlogs (video blogs) in a single proposition) can register and manage their services and content for discovery and use by content receivers 108 configured to receive content made available through the MDMS 110. Content owners can also configure additional products and services via the MDMS 110 such as content subscriptions and promotions and their content owner branding and interactive options are preserved across all devices wherever their content is displayed.

A content receiver user having content stored on their own local content domain may also be able to register and manage content stored on that local content domain using the MDMS 110, and for discovery and use using their content receiver. In this case, the content receiver user is effectively another content owner.

The MDMS 110 implements a range of functions, namely:
a. The registration of Internet video sources and libraries to enable the search, discovery, navigation and playing of content on multiple TV device types;
b. The registration of interactive destinations and TV applications to enable their search, discovery, navigation and access on multiple types of TV device;
c. The management of content branding, media searches, recommendations, interactive links and promotions for content owners (including advertising and sponsorships) such that the correct branding and facilities are displayed to the viewer whenever their content is being accessed, across multiple types of TV device—this capability is common to TV broadcasters, Internet video aggregators, and interactive application owners;
d. The registration of "users"—such as TV viewers, and the management of their personalisation information, such that a viewer's identity and personalisation information is available across multiple types of TV device;
e. The provision of a range of content discovery services, such as:
   i) Centralised search across all content;
   ii) Content recommendations;
   iii) Content sharing between community members;
   iv) Content promotion for content owners;
   v) Resolution of TV Keys™ f. The implementation of distribution arrangements and rights restrictions for content owners, particularly the enforcement of territory rights restrictions.
g. Centralised subscription payments services and micro billing (billing for individual content items) for all content owners;
h. Advertising services which may comprise a range of products, for example:
   i) "click through" advertising links to video or interactive destinations;
   ii) Insertion of video advertising in playlists and video content consumption;
   iii) Interfacing to standard $3^{rd}$ party Internet ad serving infrastructures and campaign management and sales facilities; and
   iv) The provision of viewer targeting data to $3^{rd}$ party ad serving engines.

FIG. 3 schematically illustrates the MDMS 110 and components thereof according to one or more embodiments of the present invention.

The MDMS 110 includes a network interface 112 providing a route through which the MDMS 110 is coupled to the communications network 104. The MDMS 110 communicates with the content sources and content receivers over the communications network 104 via the network interface. Content received at the MDMS 110 from the content sources may include, for example, content metadata to feed a search and retrieval module (e.g. Web feeds such as RSS XML feeds), content owner branding data for application to content to be displayed, other content owner rules relating to display and consumption of their content.

A configuration module 114 of the MDMS 110 is configured to provide a means for content owners to register and manage their content. The configuration module 114 comprises a processor and a data storage module.

The configuration module 114 also provides a means by which content receiver manufacturers, i.e. OEM manufacturers, can specify how data and information should be displayed when the system of the invention is implemented using their specific content receivers. An identity services module 124 (described in more detail later) provides a means by which end-users' (i.e. viewers using a content receiver implementing the system of the present invention) presentation preferences describing how data and information should be displayed on their content receivers are stored, e.g. personalising how menus appear when displayed via their content receivers.

A content manager 116 (described in more detail later) is operative to combine the configurations and preferences specified by the above three different parties.

When initially registering their content with the MDMS 110 to make such content available to viewers having content receivers configured to receive such content via the MDMS 110, content owners conduct a set-up process using the configuration module 114. This set-up process may be conducted by the content owner, perhaps at a remote location, by way of a content owner terminal, for example, a PC, arranged to communicate with the configuration module 114 via the communications network 104 and network interface 112.

In an example, the content owner could use the PC to navigate to a specific web-page to initiate the set-up process. The configuration module 114, upon receiving a request for the web-page data from the PC, transmits the relevant web-page data to the PC of the content owner to allow the content owner to conduct the set-up process. The content owner is presented with a content owner interface which displays a number of functions relating to how it wishes to configure its content. In this regard, the content owner can define:

Its MediaRSS feeds and associated parameters that will be retrieved by the content indexer 118. This is so that the content owner's content items can be presented to a user in search results and recommendations when they are relevant to the search or recommendation being performed by the MDMS 110.

Content item presentation information such as their branding

The categories of content they support e.g. general video, news etc.

Content subscription packages and pricing and the rules used to identify the content items that belong to each subscription package.

Distribution arrangements such as the OEMs or service providers (collectively termed operators) on whose content receivers their content is to be made available and/or in which territories their content can be made available.

The content owner may also wish to configure a content menu application to be made available to the viewer when the viewer is consuming content from that content owner. Again, this content menu registration option may be specified during the initial set-up process or at a later time. The content menu registration option also provides the content owner with the ability to configure specific menu items which access services of the MDMS such as: a search application which allows a viewer to search only within content of that content owner; a content recommendations application which provides a viewer with recommendations from the content of that content owner; quasi-channel applications in which themed content from that content owner is arranged into such quasi-channels either statically or dynamically using pre-defined searches and recommendations which can then be performed without data input from the end viewer; and an advertising application whereby space on the content menu of that content owner can be sold for advertising or can be used to promote specific content from that content owner with the ability to click through the advertising to a piece of content or an interactive destination.

The content owner indicates that the content is configured as they require it to be using the content owner interface of the web-page displayed at their terminal and, upon such indication; the terminal transmits this configuration parameters data via the communications network 104 and network interface 112 to the configuration module 114. Upon receipt of the data, the configuration module 114 sends a confirmation to the content owner terminal that the configuration parameters data has been received and stores the configuration parameters data within its data storage module.

Although described from the viewpoint of a content owner specifying their requirements, a service provider and/or an OEM could specify their own branding and presentation requirements and menus using the same interface, though the options available for configuration may be different for these different roles.

The data storage module of the configuration module 114 is configured to maintain a database of the content configuration parameters data for retrieval by a content manager 116 which can subsequently apply the content configuration parameters data to content to be transmitted to content receivers.

The MDMS 110 is arranged to retrieve the content metadata configured by the content owners to enable the provision of content search and recommendations to content receivers. The content metadata is retrieved over the communications network by the content indexer 118, optionally as a media RSS XML feed. The content indexer 118 retrieves the content owner feed configurations from the content owner configuration 114, retrieving and processing the content owner feeds as specified. The content indexer 118 augments the metadata retrieved from the content owner with derived data using MDMS rules (such as the appropriate MDMS quality classification and the protocols and codecs implied by the one or more content references) and data derived using the relevant content owner configuration retrieved from the content owner configuration 114 (such as the presentation information, distribution networks and territories and the subscription packages that each content item is associated). The XML metadata for each content item is then passed to a search and retrieval module 120 which indexes and stores the content metadata data in its associated storage.

The received content metadata includes data (e.g. a URL) identifying a location at the content source of the actual content instances to which it relates (with each content instance being associated with a different protocol/codec/bandwidth combination) and thus the search and retrieval module 120 maintains a list of content references for each content item registered by content owners.

A search and recommendations module 122 is arranged as an access layer to the search and retrieval module 120. This exposes a straightforward XML based services API to the content manager 116 for each of the service requests the content manager 116 requires and implements each of these requests utilising one or more of the proprietary APIs and services provided by the search and retrieval module 120.

The MDMS 110 further comprises an identity services module 124 comprising a processor and a user identity storage module. The user identity storage module of the identity services module 124 is configured to store data relating to identities corresponding to different users of a content receiver, e.g. an identity for each individual member of a household. This module provides a user profile data model to be associated with the identities which may comprise:

nickname
personal details including a unique mobile number and/or email address
viewing and content preferences including PIN protection settings
content receivers that this profile is associated with
purchased subscriptions and content items
content item history
content item ratings
content item bookmarks and playlist tags Various user actions on the content receiver initiate communication with the identity service module 124 some of which result in the current user's profile being updated by the identity services module 124. Examples of these communications include: editing and saving user details and preferences, viewing bookmarks, bookmarking a content item, rating a content item, viewing a content item etc. A default identity of a content receiver may be tied to a unique identifier of the content receiver itself which is used when no individual identity has been identified. This default identity may be associated with the subscriber details where the content receiver has been provisioned by a service provider.

With this arrangement, profile information of users (including, for example, feedback from their consumption of content) can be used to improve targeting and particularly recommendations of content to specific users. This is achieved by the identity services module 124 creating user profiles in the search and retrieval module 120 and populating these with the content items consumed by each user profile. The search and retrieval module can then make consumption informed user recommendations when requested by the search and recommendations module 122.

In response to reception at the MDMS 110 of an instruction from a content receiver to switch user (such instruction invoked by a user action in relation to the content receiver, i.e. selection of a user associated with the content receiver and optionally the entering of a personal identification number (PIN) code, e.g. via a remote control), the instruction, user identifier, receiver identifier and optional PIN are delivered to the identity services module 124 via network interface 112. The identity services module 124 retrieves the relevant user's profile data from its storage module, checks the PIN if required and, if successful, records the new user as the current user for this content receiver in its storage module and generates and returns to the content receiver the user menu appropriate for this user on this content receiver. This new user menu may result in additional requests from the content receiver to the content manager 116 to populate content items (such as the user content recommendations).

When a user of a content receiver wishes to search for specific content and initiates a search via their content receiver to search for such specific content, a search request is received by the network interface 112 via the communications network 104 for the content receiver and delivered to the content manager 116. The content manager 116 then constructs the search query adding a number of additional constraints to the search that are derived from the capabilities and attributes of the content receiver. In particular the content receiver may provide the content receiver identifier, type and operator as part of the search request and the source IP address can be determined from the TCP/IP networking protocols. These are passed to the content receiver profiler 136 which determines and returns:

The protocols and codecs supported by this type of content receiver. This data is configured and stored for each type of content receiver in the content receiver profiler 136. The dataset for this type of content receiver is retrieved from this store.
The operator associated with this content receiver.
The bandwidth capability of this content receiver's network. This bandwidth would have been submitted to the content receiver profiler 136 by the content receiver during an earlier bandwidth test, typically performed on booting the content receiver and stored by the content receiver profiler against the content receiver identifier.
The determined territory of the content receiver. This is derived from the source IP of the content receiver using an IP to geographical location (in this instance, territory) mapping table.

The content manager 116 then instructs the search and recommendations module 122 to execute the constructed search query. The search and recommendations module 122 extracts the search parameter data from the request in order to address the specific interface of the search and retrieval module 120. The search is then performed by the search and retrieval module 120 as instructed by the search and recommendations module 122 and the metadata of the relevant content items is retrieved and returned to the content manager 116. These search results are then transmitted to the content receiver from which the search request was received.

The effect of the combination of this constrained search query implemented by the content manager 116 against the content metadata augmented by the content indexer 118 is to ensure that only content appropriate for and functional on the content receiver is presented to the user. This process applies to recommendations and other content requests.

When a user of a content receiver instigates a search, any content results returned to the user may optionally be tailored for that user based upon the user's profile. Thus, in this case, the content manager 116, upon receipt of a content request via the network interface 112 adds further constraints to the search query. First it requests the user profile data related to the current user who requested the search to the identity services module 124. The identity services module 124 retrieves the user profile data and returns this to the content manager 116. The content manager 116 amends the search request data to include any relevant profile settings (such as safe search i.e. no adult content) as additional terms in the search query prior to submitting the query to the search and recommendations module 122. Upon reception of such amended search request data, the search and recommendations module 122 proceeds in the manner described above to retrieve the metadata of content items relevant to the search request and these search results are returned to the content manager 116. In addition the content manager 116 may augment the content item metadata returned with relevant user specific metadata such as the user's rating, any user tags, whether or not the user is already entitled to view the content as part of one of their active subscription packages etc. before transmitting the content metadata to the user's content receiver. Thus a personalised form of content presentation can be delivered to the user while still maintaining the requirements and constraints of other parties (i.e. content owner, etc.).

In some instances a further variation of the above scheme may be utilised, particularly when a user has knowledge of the content items being displayed (such as their bookmarked content items), where content items that are not functional on the device are still returned in the results but have their content item metadata further augmented to indicate that they are non-functional content items. This avoids the user thinking that the system has lost content items that they are aware of if they move between content receivers with different capabilities.

The MDMS 110 offers a range of functions to a user of a content receiver which might include, for example: video search and recommendations; interacting with content provider menus; registering new profiles (individual identities); administering payment instruments and billing, transactions and payments authorisation; managing favourites, playlists and history; interacting with messages and other users; and setting up user preferences and options.

A display format for display of the content owner specified and/or personalised form of content on a display screen is delivered to a content receiver from the content manager 116 via network interface 112 and communications network 104. This display format is controlled by the content manager 116 based upon the content configuration parameters data stored in the data storage module of the configuration module 114 and/or the user profile data stored for the current user in the storage module of the identity services 124

The display format is delivered in markup which describes how to display the required functionality of the user interface either via a graphical menu on the TV screen or via a browser application on the content receiver or a third party interactive TV engine.

Communication between the content receiver 108 and MDMS 110 takes place via the content receiver services module 126 which is arranged to service requests from the content receiver 108, enforce security and access controls for protected premium content and may compile XML content responses into a binary representation of XML for efficient communications and processing on the content receiver.

The content receiver services module 126 comprises the following modules: content manager 116 (as hereinbefore described); identity services module 124 (also hereinbefore described); content enforcement module 128; payment services module 130; and image transcoder 132.

The content enforcement module 128 is the element of the content receiver services module 126 configured to gate and authorise the playing of protected (e.g. premium or restricted) content. The content enforcement module 128 operates in conjunction with a payment services module 130, subscription management module 134, the identity services 124 and the content receiver profiler. Such enforcement is implemented by checking territory restrictions, subscription entitlements, informing the user of any gating actions required (e.g. PIN entry required, purchase required, etc.) and requesting authorised content URLs from content owners to provide a content receiver access to a content item. In this regard, a request for a content URL is sent from the content receiver and received at the MDMS 110 via the network interface and forwarded to the content enforcement module 128. The content enforcement module 128 first makes a request to the search and retrieval module 120 for content metadata relating to the content item which the user has requested. The processor of the search and retrieval module 120 retrieves the content metadata from the data storage module of the search and retrieval module 120 and returns the retrieved content metadata to the content enforcement module 128. If the content item is identified as a premium content item the content enforcement module 128 requests the current user's subscription entitlements from the subscription management module 134. The subscription management module 134 retrieves and returns the user's active subscription entitlements to the content enforcement module 128 and the content enforcement module 128 checks these against the content item subscription packages to determine if the user is entitled to view the content item. If the content item is identified as being restricted by territory the content enforcement module 128 requests the content receiver's territory from the content receiver profiler 136 and checks if the content receiver is entitled to access the content item. Finally the content item is checked to see if it is marked as restricted.

If all conditions are met and the user is eligible to view the content, the URL of the content item is transmitted by the content enforcement module 128, via the network interface 112, to the content receiver. Upon reception of the content URL the content receiver can then retrieve and play the requested content item from the content owner's content source. Optionally the content enforcement module 128 may request a content access authorisation token from the content owner which is transmitted to the content receiver and used by the content receiver when retrieving the content item. This enables the content owner to restrict access to their content to trusted MDMS content receivers.

If, as a result of a determination by the content enforcement module 128, the content requested by a user cannot be viewed by that user then the content enforcement module 128 transmits, via the network interface 112, to the content receiver one of a number of response conditions:

Subscription required with the subscription offers. The offers are presented and if one selected a payment process is initiated by the content receiver against the payment services module 130. On completion of this process the content URL is re-requested from the content enforcement module 128.

PIN required. The PIN is then submitted with a re-request for the content URL which is checked by the identity services module 124 before the content URL is returned.

Unauthorised content. Access to the content is denied.

When a payment process is initiated against the payment services module 130 the content receiver issues a request to the payment services module 130 which returns for payment details to the content receiver. This causes the content receiver to effect display of a payment details request message on an associated display device. In response to the message a user may have the options of rejecting the request for payment details or accepting the request. If the request is accepted, the user is prompted to enter appropriate payment details which are returned to the payment services module 130 via the communications network 104 and network interface 112. As will be appreciated, the user commands in response to the payment details request may be entered via a user interface device, such as a remote control, of the content receiver.

When payment details data is received, confirmed and successfully processed by the payment services module 130, it transfers the subscription purchased to the subscription management module 134 where it is stored against the current user in the associated subscription storage module. The subscription management 134 also forwards this information to the identity services module 124 to update the user profile data relating to that user to include the subscription package upgrade.

Image transcoder 132 is configured to re-encode images stored in standard web formats (e.g. portable network graphics (PNG), JPEG) to a format supported by any given content receiver. Thus, when image data is transmitted to a content receiver, the image transcoder 132 ensures that such images are supported for display by that content receiver. The content receiver informs the image transcoder the source image URL and what image format it requires. The image transcoder 132 retrieves the source image URL over the network interface 112 and then transcodes the image into one of the required formats before transmitting the transcoded image to the content receiver.

MDMS 110 also comprises an advertisement management module 137 which is configured to receive advertisement management campaign metadata from one or more advertisers. The metadata includes locators (e.g. URLs) of one or more repositories of advertisers containing replacement advertisement content items. The advertisement management module 137 performs a matching process (discussed further below), to determine replacement advertisements likely to be of interest to a user currently logged on to the content receiver. The locators of these replacement advertisements determined during the matching process are forwarded to the network interface 112 for transmission via the communications network 104 to the content receiver.

The locators received at the content receiver are transferred to the CPU, upon which is implemented an advertisement break module (see FIG. 4). The advertisement break module includes a replacement advertisement acquisition module (described in more detail in relation to FIG. 5) which sends requests containing the locators to the one or more repositories of the advertisers for retrieval of corresponding replacement advertisements. In response to such requests, the one or more advertisers' systems retrieve the requested replacement advertisements and forward them to the content receiver. These replacement advertisements are stored in the content receiver for retrieval to be inserted in place of original advertisement content items in a broadcast video content item received at the content receiver such that the video output from the content receiver contains replacement advertisement content items in place of the original advertisement content items in an advertisement. Thus, when the video output of the content receiver is displayed, the replacement advertisement content items are seen during an advertisement break in the broadcast video content item instead of the original advertisements.

The identity services module 124 contains pertinent information (e.g. preferences, age, etc.) about one or more users of a particular content receiver. The advertisement management module 137 performs a matching process to locate advertisement content items which are likely to be of interest to the one or more users, based upon their profiles stored in the identity services module 124. The advertisement management module 137 can manage a number of advertisement campaigns with metadata which may comprise, for example, demographic criteria, cost of display, budget and asset reference.

The matching process may compare metadata of advertisement content items with the user profile information to determine those advertisement content items which are most relevant to a particular user. When the process is complete, the advertisement management module 137 sends a request over the communications network 104, via network interface 112, to the content receiver indicating the advertisement content items to be retrieved by the content receiver. These advertisement content items can be retrieved from the content source by the content receiver.

In an optional arrangement, one or more advertisement content items are retrieved from respective repositories of content sources of advertisers and returned to the advertisement management module 137 via the communications network. These received one or more advertisement content items either may be stored within a storage device of the advertisement management module 137 for retrieval therefrom by the content receiver from the advertising management module 137.

The matching process algorithm implemented by the advertisement management module 137 may be without limitation, for example, a Doubleclick® algorithm, or a 24/7 Real Media algorithm.

Replacement advertisement content items received at the content receiver are inserted by the content receiver into an advertisement break of a broadcast content item received at the content receiver in place of original advertisement content items in the advertisement break. The content receiver comprises functions (which will be discussed in more detail later) which allow a user to instruct the content receiver to "skip" from one replacement advertisement content item to another. If the user instructs the content receiver to skip display of a replacement advertisement content item in such a manner, display of that replacement advertisement content item will be halted and another replacement advertisement is displayed.

Whether or not a user views a replacement advertisement content item or skips such a content item is of value to advertisers because it provides a measure of the success of an advertisement in an advertisement campaign. Therefore, the content receiver compiles feedback reports for each replacement advertisement content item in a playlist to indicate if that content item has been: displayed and viewed in full (i.e. a skip or fast forward function has not been activated whilst that content item is displayed); displayed and skipped; or not shown (e.g. the end of the advertisement break was reached before the content item could be shown). The advertisement break module of the content receiver comprises a replacement advertisement monitoring module to monitor any user inputs to the content receiver during display of the replacement advertisement content items and prepares the feedback report mentioned above. The process by which the replacement advertisement monitoring module achieves this is described in more detail in relation to FIG. 5.

When a feedback report has been compiled, this is passed to a network interface of the content receiver (see FIG. 4) and forwarded to the MDMS 110 via communications network 104. The received feedback report is transferred to the advertisement management module 137 which notes the report for each replacement advertisement content item. This report can be supplied to advertisers on a periodic basis.

FIG. 4 schematically illustrates a content receiver 108, components thereof and components related thereto. The content receiver 108 receives content via the communications network 104 and broadcast video distribution network 106 and can transmit data to the MDMS 110 via communications network 104. Whilst data paths are illustrated between some elements of the content receiver 108, not all data paths are illustrated for the purposes of clarity.

The content receiver 108 comprises a hardware components layer 138, an OS, drivers and middleware layer 139 and a software applications layer 140. Applications in the OS, drivers and middleware layer 139 and software applications layer 140 are arranged to run on a central processing unit (CPU) 141 of the content receiver 108.

Along with CPU 141, the hardware layer 138 comprises a distribution receiver 142, a network interface 146, a demultiplexer 1420, a video decoder 143, an audio processor 1430, a graphics processor 144, a content output module 145, a memory component (RAM) 147, an input receiver 150, and disk storage 163. Disk storage 163 includes a replacement advertisement address database 164 and a replacement advertisement database 1631.

The distribution receiver 142 (such as a tuner for receiving a terrestrial digital television broadcast) receives content at the content receiver 108 from the broadcast video distribution network 106 in the form of, e.g. an MPEG 2 transport stream. This transport stream is transferred to demultiplexer 1420 which extracts a data portion of the transport stream and forwards the data portion to the CPU 141 which, in conjunction with an electronic programme guide application (ERG) 148 running thereon, processes EPG data for use by the EPG application A video portion of the received content from the broadcast video distribution network 106 is extracted by the demultiplexer and transferred to the video decoder 143. The video decoder 143 prepares video content for output on the content display 149 by the content output module 145. The content output module 145 overlays any graphic output required by any of the software applications identified in the software applications layer 140 as output by the graphics processor 144 under instruction from the CPU 141 over the video content and outputs the combined output to the content display.

An audio portion of the received content from the broadcast video distribution network 106 is extracted by the demultiplexer and transferred to the audio processor. The audio processor 1430 processes the audio content and outputs to the content display 149.

Output protocols supported by the hardware of the content receiver 108 may comprise one or more of: High Definition Multimedia Interface (HDMI); Component Video; SCART; Composite Video and audio outputs such as Dolby Digital and stereo analogue.

The OS, drivers and middleware layer 139 comprises a graphics layer module 151, a networking services module 152, an audio services module 153, a personal video recorder (PVR) sub-system module 154, a digital video broadcasting (DVB) stack module 155, a storage services module 156, a system services module 157, and an operating system application 161 and drivers 162. These modules are conventional features on many content receivers (such as set-top boxes). Further description of these modules will therefore only be provided where necessary in relation to the functioning of one or more embodiments of the present invention.

Input receiver 150 is arranged to receive commands for controlling the content receiver 108, such commands being input by a user by way of an input device 158. The commands may be entered using, for example, a set-top box remote control device through which commands are entered by the user by pressing specific keys of the remote control device. A control signal from the remote control is transmitted to the content receiver 108 by any suitable means, e.g. infra-red transmission.

The software applications layer 140 of the content receiver 108 comprises: an EPG module 148 (referred to above); a browser application 159; and a media display management module application (MDMM) 160.

Although a browser application is shown in the illustrated embodiment, other suitable interactive display engines may be used, e.g. a flash engine such as Adobe® flash engine.

The MDMM 160 runs on the CPU 141 and configures the CPU 141 for communication (via network interface 146) with the MDMS 110 in order to manage content received at the content receiver 108 over the communications network 104. Commands input by a user requesting delivery of a content item to the content receiver 108 are received at the input receiver 150 and communicated to CPU 141 which implements the MDMM 160 to request content data appropriate to the command from the MDMS 110.

Where the CPU 141 instructs the video decoder 143 and audio processor 1430 to process video received over the communications network 104 via the network interface 146 this will be buffered by the CPU 141 in RAM 147 and then the video and audio portions will be retrieved by the video decoder 143 and audio processor 1430 using direct memory access (DMA) in the same manner as when the video was received over the broadcast video distribution network 106 via the distribution receiver 142.

CPU 141 also implements MDMM 160 to manage and control content received at the content receiver 108 over the broadcast video distribution network 106.

The one or more replacement advertisement content items identified during the matching process as discussed above in relation to FIG. 3 are retrieved by the content receiver from repositories of advertisers. The content receiver 108 forwards locators with each request to enable systems at the content sources to locate the replacement advertisement content items. Once such items are located, the systems at the content sources forward the items to the content receiver 108 where they are received at the network interface 146 of the content receiver 108 via communications network 104. These one or more replacement advertisement content items are transferred to a replacement advertisement database 1631 which comprises a portion of disk storage 163.

In more detail, on initial registration of the content receiver with MDMS 110 (a process which creates a default user) or the adding of a new user, a list of replacement advertisements which "match" that user's profile is created by the advertisement management module 137. Locators of the replacement advertisements in that list, and additional metadata describing the attributes/constraints associated with each replacement advertisement, are provided to the content receiver 108. Upon receipt at the content receiver 108, the locators are stored in replacement advertisement address database 164. An advertisement acquisition module of the content receiver sends requests to repositories of the advertisers denoted by the locators for retrieval of replacement advertisement content items. These items are communicated via the communications network to the content receiver where, upon receipt, they are transferred to the replacement advertisement database 1631 for storage and each of the locators stored in the replacement advertisement address database 164 is replaced with the local address of a corresponding replacement advertisement content item on the replacement advertisement database 1631. That is, the replacement advertisement address database 164 stores the addresses where each replacement advertisement content item is stored in the replacement advertisement database 1631.

The replacement advertisement content items stored in the replacement advertisement database 1631 may be flagged with restrictions, such as: how many times an advertisement can be shown during the same TV programme; how many times an advertisement can be shown per unit of time, for example, per hour; if an advertisement can only be shown after a certain time (e.g. 9 pm) because it contains adult content; and may also be flagged with an expiry date. For example, an advertisement campaign may be scheduled to end on a particular date, and the advertiser will not want a replacement advertisement relating to that campaign to air after that date. Therefore, an expiry date flag provided as, for example, meta-data relating to that replacement advertisement, will be noted by a replacement advertisement playlist compilation engine (described in detail later), and that advertisement will not be added to a playlist. An example of the data stored in the replacement advertisement database 1631 is illustrated in FIG. 6.

Thus, it will be appreciated that the replacement advertisement database 1631 needs to be replenished over time as advertisements expire, and also simply to avoid over-repetition of the same replacement advertisements. Replacement advertisements may be retrieved in the background of normal operation of the content receiver as available bandwidth allows, such as idle periods, or periods where the content receiver is in "stand-by" mode.

The description hereafter assumes that a number of replacement advertisement content items have been "uploaded", in the manner described above, to the replacement advertisement database 1631 of the content receiver and are stored thereon.

One or more replacement advertisement content items can be retrieved from replacement advertisement database 1631 of disk storage 163 as required to construct a playlist of replacement advertisement content items for insertion into a received broadcast video content item. Retrieval, construction and insertion of the playlist of replacement advertisement content items into the received broadcast video content item will be described in more detail later.

DVB stack 155 comprises a series of modules operative to drive the TV system of the content receiver. Such a feature is known in conventional content receivers (e.g. set-top boxes) and known manufacturers are, for example, OpenTV, NDS, or Direct TV.

The DVB stack 155 is configured to detect a signal in a received broadcast video content item indicating that an advertisement break is due to commence. The DVB stack 155 forwards a first notification signal to the CPU 141 that such a signal has been detected. Upon receipt of such first notification signal at the CPU, an advertisement break module 1630, running on the CPU 141, instructs the CPU 141 to retrieve the one or more replacement advertisement content items from the replacement advertisement database 1631 of disk storage 163. The replacement advertisement content items are targeted against a user currently logged-in to the content receiver (this will be described in more detail below). The advertisement break module 1630 constructs in RAM 147 a playlist of replacement advertisement content items for insertion into the advertisement break of the broadcast video content item. The playlist comprises a list of local addresses of replacement advertisement content items to be inserted.

Optionally, the total length of one or more replacement advertisement content items in the playlist is equal to the duration of the advertisement break.

The DVB stack 155 is configured to detect a signal in a received broadcast video content item indicating the start point of an advertisement. The DVB stack 155 forwards a second notification signal to the CPU 141 that such a signal has been detected. Upon receipt of such second notification signal at the CPU 141, the CPU 141 instructs the video decoder 143 to stop decoding the broadcast video content stream and decode the playlist of one or more replacement advertisement content items. The advertisement playlist insertion engine 166 instructs the video decoder 143 to stop decoding the incoming broadcast video content stream and instructs the video decoder to perform DMA of the replacement advertisement database 1631 at a given address of a first replacement advertisement content item. Upon receipt of such an instruction, the video decoder 143 stops decoding the incoming broadcast video content stream and the display of a content item in that video content stream, and instead invokes the display of a first replacement advertisement as retrieved from replacement advertisement database 1631. A retrieved replacement advertisement content item is inserted into the advertisement break of the broadcast video content item received at the content receiver 108 at commencement of the advertisement break. Thus, the playlist of one or more replacement advertisement content items replaces one or more original advertisement content items in the advertisement break in the video output of the content receiver 108.

Again, a detailed description of the process by which the playlist is retrieved, constructed and inserted is provided later.

The content receiver 108 is configured to allow a particular displayed replacement advertisement content item to be skipped such that another stored replacement advertisement content item is displayed in place of the current item. Thus, for example, if a user is not interested in a replacement advertisement content item currently being displayed to them, they can instruct the content receiver to invoke the display of another replacement advertisement content item by entering a command to the content receiver 108 through input device 158.

Such an entered command is received by the input receiver 150 and forwarded to CPU 141. The CPU 141 instructs the video decoder 143 to stop display of the current replacement advertisement content item, and orders the video decoder 143 to invoke display of the next replacement advertisement content item from the playlist of the one or more replacement advertisement content items.

Of course, a particular replacement advertisement content item may be of interest to the user and may thus be watched in its entirety. In this case, when the particular replacement advertisement content item concludes, the video output stream continues with the next one of the replacement advertisement content items of the playlist of one or more stored replacement advertisement content items.

As noted above, it is envisaged that a total duration of all the one or more replacement advertisement content items stored in disk storage 163 is at least equal to the length of the advertisement break into which they are to be inserted in place of original advertisement content items. However, if, through user entered commands which instruct the content receiver to perform skipping of the majority of stored replacement advertisement content items, it will be appreciated that a final stored replacement advertisement content item in the playlist is displayed and will conclude before conclusion of the advertisement break. In such a case, the playlist is repeated from the beginning. This arrangement effects display of the replacement advertisement content items in a loop or carousel type arrangement.

In an optional arrangement, the content receiver is operative to invoke display of a visual prompt on the display means. This visual prompt indicates to the user that it is possible to skip to the next advertisement content item by pressing, for example, a fast-forward button on the remote control device.

Advertisement break module 1630 will now be described in more detail in relation to FIG. 5.

In general overview, advertisement break module 1630 comprises a replacement advertisement playlist compilation engine 165, a replacement advertisement playlist insertion engine 166, a replacement advertisement acquisition module 1632 and a replacement advertisement monitoring module 1633. The replacement advertisement acquisition module 1632 and replacement advertisement playlist compilation engine 165 are operative to communicate with replacement advertisement address database 164. The replacement advertisement acquisition module 1632 is operative to communicate with replacement advertisement database 1631 to store replacement advertisement content items therein which have been retrieved from content sources, and the replacement advertisement playlist insertion engine 166 is operative to retrieve replacement advertisement content items from the replacement advertisement database 1631.

One or more locators are requested by the content receiver 108 via communications network 104 from the advertisement management module 137 of MDMS 110. The one or more locators comprises addresses in advertisers' repositories where replacement advertisement content items are stored, and from where those replacement advertisement content items can be retrieved.

In an optional arrangement, separate requests may be sent to the advertisement management module 137 for each user of a content receiver for which there exists a user profile.

Upon receipt of the one or more locators, the replacement advertisement acquisition module 1632, executed on CPU 141, stores these locators in replacement advertisement address database 164. The replacement advertisement acquisition module 1632 then sends requests including the locators to advertisers' content source systems for retrieval of replacement advertisement content items. Retrieved replacement advertisements are transferred to replacement advertisement database 1631 for retrieval therefrom at an appropriate time. Each of the locators stored in the replacement advertisement address database 164 is replaced with the local address (i.e. the address in the replacement advertisement database 1631) of the corresponding replacement advertisement content item.

Replacement advertisement playlist compilation engine 165 compiles a playlist descriptor (not shown in FIG. 5, but illustrated in FIG. 7 and described in relation thereto) based upon replacement advertisements stored in the database, and based upon the currently logged-in user. The playlist descriptor comprises local addresses (i.e. addresses in the replacement advertisement database 1631) of the replacement advertisement content items of the playlist.

As noted above, the playlist descriptor comprises a list of local addresses (as retrieved from replacement advertisement address database 164) of the replacement advertisement database 1631 of disk storage 163 where replacement advertisements to form part of the playlist of one or more replacement advertisements are stored. That is, the playlist descriptor comprises a list of pointers to locations where replacement advertisements are stored on the replacement advertisement database 1631. The order of addresses in the playlist descriptor corresponds to the order in which replacement advertisements found at those addresses will appear in the playlist when compiled. The playlist descriptor links together replacement advertisements into a playlist.

The replacement advertisement playlist insertion engine 166, executed on CPU 141, extracts the addresses from the playlist descriptor (stored in RAM 147) and retrieves a replacement advertisement from each address in the replacement advertisement database 1631. A retrieved replacement advertisement is buffered from the replacement advertisement database 1631 for insertion into an advertisement break at an appropriate time.

In order to insert a playlist of replacement advertisements into a broadcast video content stream received at the content receiver in place of original advertisements in the content stream, markers denoting the start and end of the advertisement break are required. These markers are required in the transport stream (such as an MPEG 2 transport stream) of the broadcast video content stream. A start marker enables the playlist of replacement advertisements to be inserted at the correct point in the received broadcast video content stream, i.e. at the start of the advertisement break.

In addition to the above start and end markers, a pre-start marker may be included in the transport stream to allow the content receiver to retrieve the playlist of replacement advertisements in readiness for an approaching advertisement break. This is to provide for a substantially seamless progression of the video output so that a gap in the video output stream between a television programme and display of the first replacement advertisement content item in the video output stream is avoided.

These markers will be discussed in more detail below in relation to FIG. 9.

The pre-start marker is extracted from a transport stream received at the content receiver by the demultiplexer 1420 (see FIG. 4). The arrival of the pre-start marker is notified to the replacement advertisement playlist insertion engine 166, executed on CPU 141, which prepares to retrieve the playlist of replacement advertisements. When the start marker arrives at the content receiver, it is extracted from the transport stream by the demultiplexer 1420 and the arrival thereof is notified to replacement advertisement playlist insertion engine 166. The advertisement playlist insertion engine 166 instructs the video decoder 143 to stop decoding the incoming broadcast video content stream and instructs the video decoder to perform DMA of the replacement advertisement database 1631 at a given address of a first replacement advertisement content item. Upon receipt of such an instruction, the video decoder 143 stops decoding the incoming broadcast video content stream and the display of a content item in that video content stream, and instead invokes the display of a first replacement advertisement in the playlist as retrieved from replacement advertisement database 1631.

When the first replacement advertisement in the playlist concludes, a second replacement advertisement in the playlist is displayed, and so on.

Management of return to a broadcast video content item after the advertisement break will be described in more detail later.

As discussed briefly above, whilst a replacement advertisement content item is displayed, a user can instruct the content receiver to skip a remainder of a currently displayed replacement advertisement content item. The content receiver invokes display of a different replacement advertisement content item from the playlist instead.

Such user instructions can be entered via input device 158 (e.g. a remote control) using key-presses of keys on the input device. Therefore, pressing a "skip" or "fast-forward" button on the remote control instructs the content receiver to stop playing a current replacement advertisement content item and invoke display of a different replacement advertisement content item from the playlist. Optionally, this different replacement advertisement content item may be a next replacement advertisement content item in the playlist, or may be selected using a replacement advertisement content item identifier selected from a displayed list of replacement advertisement content item identifiers, e.g. a visual representation of the playlist.

The replacement advertisement monitoring module 1633, executed on CPU 141, is notified when a replacement advertisement content item is displayed. A duration of the replacement advertisement content item currently being displayed is also provided to the replacement advertisement monitoring module 1633.

The replacement advertisement monitoring module 1633 calculates the number of clock signals (not shown) corresponding to a total length of the replacement advertisement content item.

The replacement advertisement monitoring module 1633 monitors signals received at the CPU 141 relating to a user input signal received from the input device. If a signal for invoking "skip" or "fast-forward" of the currently displayed content item is detected, the replacement advertisement monitoring module 1633 notes the number of clock signals that have passed since the replacement advertisement content item started and obtains the number of clock signals between start of display and the "skip" or "fast-forward" signal. The replacement advertisement monitoring module 1633 compares this number with the number of clock signals corresponding to the total length of the replacement advertisement content item. If the number of clock signals that have passed since the replacement advertisement content item started is less than a threshold percentage (e.g. 95%) of the number of clock signals corresponding to the total length of the replacement advertisement content item, the replacement advertisement monitoring module 1633 determines that the replacement advertisement content item has been halted before its conclusion.

The replacement advertisement monitoring module 1633 prepares a feedback report entry based upon this determination, i.e. that the replacement advertisement content was not viewed in full due to user invoked skip. The feedback report entry is transferred to disk storage 163. At the end of an advertisement break, the replacement advertisement monitoring module 1633 retrieves one or more feedback report entries stored in disk storage to prepare a feedback report. Upon completion, the report is forwarded to advertisement management module 137 of MDMS 110.

In the case where a replacement advertisement content item is watched in full, the number of clock signals that have passed since the replacement advertisement content item started is greater than the percentage threshold of the number of clock signals corresponding to the total length of the replacement advertisement content item. The replacement advertisement monitoring module 1633 determines that the replacement advertisement content item has been viewed in full and prepares a feedback report entry on this basis.

The replacement advertisement monitoring module 1633, aside from monitoring to see if one or more of the replacement advertisement content items inserted in the broadcast feed are skipped, is also operative to monitor which ads are shown. This monitoring data is used to update replacement advertisement content item data sets in the replacement advertisement database 1631 for each replacement advertisement content item to indicate when a replacement advertisement content item was last shown. Thus, when another playlist is compiled, the rules applied by the replacement advertisement playlist compilation engine 165 may prevent the replacement advertisement content item to form part of the playlist for the next ad break, i.e. to prevent the same replacement advertisement content item being shown in a next advertisement break if it was shown in the previous advertisement break (if so specified by the rules).

FIG. 6 schematically illustrates data stored in the replacement advertisement database 1631. The data stored comprises a content item "data set" for each replacement advertisement content item stored in the replacement advertisement database 1631.

Data 700 is stored at a plurality of addresses 702 of the replacement advertisement database 1631 and each data set comprises: a replacement advertisement content item (e.g. in MPEG format); a replacement advertisement identification (ID) number; data indicating an external address where from where the replacement advertisement content item can be retrieved (e.g. as a URI); data indicating a local address on the replacement advertisement database where the replacement advertisement content item is stored; data indicating the date and time when that replacement advertisement content item was last shown; data indicating a minimum time between a time when the advertisement is displayed, and the next time the advertisement can be included in a playlist, i.e. once the advertisement is displayed, it cannot be included in a playlist for, e.g. at least one hour; any broadcast restrictions relating to that replacement advertisement content item (i.e. it contains adult content and can only be shown after 9 pm); data indicating to which users of the content receiver the advertisement can be shown; an expiry date of that replacement advertisement content item; a duration of the replacement advertisement content item; and display data for the replacement advertisement content item.

As described above, the replacement advertisement monitoring module 1633 monitors which replacement advertisement content items are included in playlists and/or shown. Data obtained from such a monitoring process is used to update a data set for a particular replacement advertisement content item.

In the example illustrated in FIG. 6, "Ad. 1" was uploaded from external address URI 1 and is stored at local address 1 of the replacement advertisement database 1631. It has never been included in a playlist, and at least two hours must elapse between one showing of this advertisement and the inclusion of the advertisement in a playlist for a potential next showing. The advertisement can only be displayed between the hours of 21:00 and 04:00. The advertisement should be included in playlists when User "ID 1" is logged-on to the content receiver. It should not be included in playlists after 28 Sep. 2010 because it expires on that date.

"Ad 4" of FIG. 6 is applicable to two users. As illustrated, this replacement advertisement content item can be included in playlists for both User "ID 1" and User "ID 3". This particular replacement advertisement content item was last shown on 14 Apr. 2010 at 13:01 hours when User "ID 1" was logged-on at the content receiver. It has not been shown to User "ID3".

"Ad 2" of FIG. 6 is not yet stored on the replacement advertisement database 1631. This is evident because a local address is not indicated for this replacement advertisement content item. It must be retrieved in the manner described previously and then stored on the replacement advertisement database 1631. Once it has been stored, the local address field for this replacement advertisement content item will be updated with a local address and it will be available for inclusion in a replacement advertisement playlist for User "ID2".

FIG. 7 is a schematic illustration of a playlist descriptor 167 which comprises a list of addresses of replacement advertisements (appropriate to a particular user) stored on the replacement advertisement database 1631 of content receiver. The playlist descriptor 167 contains one or more replacement advertisement data fields 172. These one or more replacement advertisement data fields 172 each comprise an address where a replacement advertisement is stored on the replacement advertisement database 1631 and an indication as to where in the playlist the replacement advertisement should be placed.

The playlist descriptor 167 illustrated in FIG. 7 is compiled by extracting one or more replacement content items from the replacement advertisement database 1631: such replacement advertisement content items being illustrated in FIG. 6 and as described above. The extraction process is performed by the replacement advertisement playlist compilation engine 165 which queries the replacement advertisement local address database 164. The replacement advertisement playlist compilation engine 165 enforces the rules/restrictions detailed in FIG. 6 to ensure that only appropriate advertisements for the current user and/or time are included in the playlist descriptor 167. The playlist descriptor 167 illustrated in FIG. 7 is an example of a particular playlist for a particular user at a particular point in time.

The replacement advertisement data fields 172 may also include other information such a, for example, replacement advertisement content item duration, and display data (e.g. the display data may comprise meta-data, and may include information regarding the advertisement title and/or a brief synopsis of the advertisement and/or a "thumbnail" image of a frame from the advertisement). This display data could be used in one or more embodiments where a menu displays a list of available advertisements for insertion. The display data may be in XML format.

The playlist descriptor 167 may be compiled by the replacement advertisement playlist compilation engine 165 prior to each advertisement break.

Thus, in the illustrated example, a playlist for insertion into an advertisement break will comprise replacement advertisements 1 to n, where replacement advertisement 1 is stored at address $X_1$ of the replacement advertisement database 1631, replacement advertisement 2 is stored at address $X_2$ of the replacement advertisement database 1631, and replacement advertisement n is stored at address $X_n$ of the replacement advertisement database 1631.

Thus, a playlist of replacement advertisements appropriate for the user currently logged on to the content receiver can be compiled and inserted in an advertisement break based upon the information contained in the playlist descriptor 167.

A typical video content broadcast stream, as illustrated in FIG. 8, such as a live television (satellite, terrestrial or cable) broadcast, contains a primary broadcast video content item 174 and one or more breaks 176 in the primary broadcast video content item 174. A typical video content broadcast stream may comprise an MPEG 2 transport stream. The MPEG 2 transport stream is described in more detail in relation to FIG. 10.

Each of the one or more breaks 176 comprises a specified time window in which at least one secondary broadcast video content item is displayed. In a particular example, the primary video content item 174 comprises a television programme and the one or more breaks 176 comprise an advertisement break in which one or more secondary broadcast video content items, (i.e. advertisement content items) are displayed. In the figure, the advertisement break contains four advertisement content items 176a, 176b, 176c, 176d.

Transition from the main broadcast video content item 174 to a break 176 occurs at a first transition point 178, whilst transition from the break 176 back to the main broadcast video content item 174 occurs at second transition point 180.

While FIG. 8 schematically illustrates a conventional broadcast video stream, FIG. 9 illustrates a modified broadcast video stream modified by a content source provider (i.e. a broadcaster) to include markers for indicating: the approach of an advertisement break; the start of an advertisement break; and the end of an advertisement break.

Thus, whilst the main broadcast video content item 174 and the advertisement break 176 (containing four advertisement content items 176a, 176b, 176c, 176d) are the same as illustrated and described in relation to FIG. 6, the broadcast video stream also includes a pre-start marker 182, a start marker 184, and an end marker 186. The pre-start marker 182 indicates that an advertisement break is approaching, a start marker 184 indicates the start of the advertisement break, and the end marker 186 indicates the conclusion of the advertisement break.

FIG. 10 illustrates, in schematic form, an exploded view of an MPEG 2 transport packet stream.

MPEG 2 transport packet streams are known and further description thereof will not be provided here.

A packet header of an MPEG 2 transport packet includes a program identifier (PID) 188. A program map table (PMT) contains information about programs and is transmitted via the PID 188. In one or more embodiments of the present invention, a conventional PMT is modified to include an advertisement table entry. The advertisement table entry comprises a private section of the PMT and includes the following: a start presentation time stamp (PTS) for a packetized elementary stream (PES) packet that contains a start point of the advertisement break; an end PTS for the PES packet that contains a start point of a program that is about to start/resume, i.e. an end point of the advertisement break. These start PTS and end PTS correspond to the start marker 184 and end marker 186 of FIG. 9. The advertisement table entry may also include data indicating the duration of the advertisement break.

The end PTS for the PES packet that contains a start point of a program that is about to start/resume after an advertisement break provides a notification to the video decoder of the content receiver to cease display of the playlist of replacement advertisements and resume the main broadcast video content item, i.e. a TV programme. However, in an optional arrangement, to be described in further detail below, this end PTS may be ignored to allow the playlist to be viewed in full. In this case, the TV programme is recorded to disk storage of the content receiver (if the content receiver, i.e. STB, comprises a PVR) and is resumed when the playlist has completed.

The advertisement table entry optionally includes a pre-start PTS for the PES packet that contains a portion of a program that is about to transfer to an advertisement break. For example, the portion of the program may be between 0.5 and 5 seconds.

The advertisement table entry optionally includes a start PTS for a PES packet containing a start point of an advertisement and an end PTS for the PES packet containing an end point of the same advertisement. Such start and end PTS data may be included for each advertisement in an advertisement break to allow selective overwriting of individual advertisements.

FIG. 11 illustrates a sequence diagram showing steps for insertion of alternative video content, e.g. replacement advertisement content items, into a broadcast stream received at a content receiver to replace content items in the stream with replacement content items.

The illustrated example assumes that, during an advertisement break, a first replacement advertisement content item 238*a* is viewed in full, and the second replacement advertisement content item 238*b* is curtailed before being viewed in full because the user invokes a skip function to change the display to a third replacement advertisement content item 238*c*. This third replacement advertisement content item 238*c* is viewed in full. The fourth replacement advertisement content item 238*d* is curtailed because it is necessary to interrupt the fourth replacement advertisement content item 238*d* in order to return to a broadcast video content item 174, i.e. a TV programme.

If, after the display of a replacement advertisement content item, the time remaining in the advertisement break is such that no meaningful portion of a further stored replacement advertisement content item can be displayed, then a short-form advertisement (e.g. 15 seconds or less) or a still image (e.g. JPEG) could be inserted into the video output stream for display during the remainder of the advertisement break.

A short-form or still image advertisement is supplied as part of the playlist of replacement advertisement content items.

The description relating to FIG. 11 is made with reference to FIGS. 3 to 7, 9 and 10.

When the content receiver initially starts-up, the replacement advertisement acquisition module on the content receiver sends a request (S190) via the communication network to the MDMS 110 for default user advertisement content items. The advertisement management module requests the default user profile information from the identity services module (S191) and, in response to such request, the identity services module retrieves the default user profile information and forwards this to the advertisement management and storage module (S192). The advertisement management module performs a targeting process as described above in relation to FIG. 3 in order to locate replacement advertisement content items which will be relevant to the default user profile. The advertisement management module provides replacement advertisement content item locators (e.g. URL addresses at content sources) to the content receiver (S194). The advertisement acquisition module then sends requests (S196) for the replacement advertisement content items to one or more content sources. The requests include the content item locators to enable the content source systems to locate the content item in their associated repositories. These one or more content sources return (S198) the requested replacement advertisement content items to the content receiver where such items are stored. The locations of these stored replacement advertisement content items on the content receiver (i.e. local addresses) are stored in the replacement advertisement database (S200). Replacement advertisement content items are subsequently retrieved as described above for insertion into a broadcast video content item.

Until additional user profiles are created or associated with the content receiver, the replacement advertisement content items used are those retrieved against the default profile.

Once additional user profiles have been associated with a content receiver, the steps of S190 to S200 are repeated (although not shown in FIG. 10) for each associated user profile, and the replacement advertisement content items stored in replacement advertisement database 1631 include replacement advertisement content items likely to be of more relevance to particular users than those replacement advertisement content items stored against the default user profile.

The advertisement content items stored in replacement advertisement database 1631 against each user may be updated when a particular profile is activated on the content receiver.

A user input "View TV" instruction (S210) received at the content receiver instructs the content receiver to tune to a TV channel indicated in the instruction, and the content receiver receives (S212) a broadcast video content item broadcast on such a TV channel. This broadcast video content item is displayed (S214).

When a pre-start marker is received (S216) at the content receiver, the replacement advertisement playlist compilation engine queries the replacement advertising database 1631 and compiles a playlist of replacement advertisement content items (S218). These query results, i.e. a compiled playlist of replacement advertisement content items, is forwarded to the replacement advertisement insertion engine.

When a start marker is received (S220) at the content receiver, the content receiver ceases to display the received broadcast video content item and displays (S222) a first replacement advertisement content item 238*a* from the playlist.

In the present instance, and as noted above, the user views the first replacement advertisement content item 238*a* in its entirety. At completion of the first replacement advertisement content item 238*a*, the content receiver displays (S224) the second replacement advertisement content item 238*b*. However, the second replacement advertisement content item is not viewed in full because the user performs a skip operation (S226) to change the display to the next replacement advertisement content item in the playlist sequence. On reception of such a skip function, the content receiver displays (S228) the third replacement advertisement content item 238*c*.

In the illustrated example, and as noted above, the user views the third replacement advertisement content item 238*c* in its entirety. At completion of the third replacement advertisement content item 1664*b*, the content receiver displays (S230) the fourth replacement advertisement content item 238*d*. However, the fourth replacement advertisement content item 238*d* is not viewed in full because it is interrupted in order for the displayed video item to return to the primary broadcast video content item (S234). This return to the primary broadcast video content item is invoked when content receiver receives the end of advertisement marker in the broadcast signal (S232).

The replacement advertisement monitoring module 1633 prepares a feedback report comprising entries relating to each replacement advertisement content item 238*a* to 238*d* displayed during the advertisement break. The feedback report identifies which replacement advertisement content items of the playlist have been displayed, which of those displayed items were viewed in full, which of those displayed items were truncated due to user actions, and which of those displayed items were truncated due to a need to return to the broadcast video content item (i.e. TV programme). The content receiver supplies the feedback report to the advertisement management module of MDMS (S236).

The reports received at the advertisement management module from the content receiver may be made available to advertisers to enable them to gauge public response to a particular advertisement campaign.

Although in the above described one or more embodiments a final replacement advertisement content item is truncated in order to return to the display of a broadcast video content item, i.e. a television programme, this need not be the case.

In a content receiver which has a programme recording capability, rather than returning to the display of a television programme, a final replacement advertisement content item may be displayed in full before returning to display of the television programme. The recording facility of the content receiver is arranged to record the television programme from the end of the advertisement break until instructed to stop recording. Thus, when the final replacement advertisement content item concludes, it is not the live television programme which is displayed, but a recorded version of it.

When the final replacement advertisement content item is viewed in full, the content receiver may also offer the user the option of viewing the television programme from its current live point, i.e. an initial portion of the television programme overlapping with the final replacement advertisement content item after the end of the original advertisement break will be missed, or to watch a recorded version of the television programme as described above.

In the above described one or more embodiments, when an advertisement break begins, a playlist of replacement advertisement content items is retrieved from replacement advertisement database 1631 of the content receiver and displayed instead of the received broadcast transport stream.

The user can opt to watch the advertisement or skip to the next advertisement in the playlist (i.e. instruct the content receiver to invoke display of the next advertisement in the playlist). This skip function can be invoked a number of times and can comprise a skip to the next/previous advertisement from the one currently being viewed.

The advertisements are arranged in a carousel-like manner. For example, the playlist contains twelve replacement advertisements, and if a skip function is performed whilst viewing the twelfth advertisement the next advertisement to be displayed will be the first advertisement.

The length of the advertisement break (typically three minutes) is maintained so that the viewer is returned to the live content at the end of the advertisement break, i.e. the live broadcast video content item is displayed at conclusion of the advertisement break. This may entail truncating a final advertisement being viewed before resumption of the live broadcast video content. For example, if a viewer begins watching a 30 second advertisement 20 seconds before the content is due to resume, the final 10 seconds of the advertisement will not be displayed.

In an optional arrangement, the viewer may opt to view the entirety of the complete advertisement and return to the primary content item, i.e. the broadcast video content item, either at the live point or at a point in history (this second option would only be available where the content receiver comprises a programme recording function).

In the above description, decoding and/or insertion of i.e. replacement advertisement content items is described with regard to video. Of course, the replacement advertisement content items typically include audio data. This audio data is decoded and/or inserted in a similar manner to the video data. Techniques for synchronising audio and video when inserting the replacement advertisement content items will be evident to those skilled in the art.

In one or more embodiments of the present invention, a visual representation of the playlist of replacement advertisement content items may be invoked for display by the content receiver upon receipt of an instruction from a user. This visual representation of the playlist of replacement advertisement content items comprises a menu having a list of selectable content identifier items.

FIG. 12 illustrates an example of a screenshot 240 of a screen displayed when such a menu feature is invoked by a user. The menu comprises a list of content identifier items comprising links to replacement advertisement content items in the playlist. The display data for the population of such a menu feature screen is described above in relation to FIGS. 6 and 7. This display data is stored in replacement advertisement database 1631.

In the illustrated embodiment, the menu contains a title field 242, a list of content identifier items 244, and a cursor 246.

The title field 242 contains text indicating to what the menu relates, i.e. "advertisement entertainment".

The list of content identifier items 244 comprises a vertical list of identifier items relating to the replacement advertisement content items available for insertion into the advertisement break in place of original advertisement content items as described above. The content identifier items 244 provide at least a name of the replacement advertisement content item (e.g. Title) and serve as links to the replacement advertisement content item they identify. Thus, if a user selects a particular content identifier item, the replacement advertisement content item associated with that identifier will be displayed using processes in a similar manner as described above.

Cursor 246 comprises a movable indication feature which highlights one content identifier item in the list of content identifier items 244. The cursor is movable vertically from a first position where a first content identifier item is highlighted to a second adjacent position where a second content identifier item is highlighted responsive to user input via the input device (e.g. Up/Down keys of a remote control).

When the cursor 246 is located over a content identifier item 244, the highlighted item may be enlarged (compared with other content identifier items 244 in the list of content identifier items 244) and/or gain a border. Additionally, further information relating to the content may be displayed within the content identifier item 244 (e.g. Quality (HD/SD), Premium Icon (to indicate that payment is required to view the content), age certificate icon, a content owner logo, content length, and one line synopsis of content).

The content identifier items 244 may comprise one or more of: image data; video data; and text data. The image data may comprise images and/or icons in a particular format e.g. JPEG.

The cursor 246 may also comprise a directional indicator to indicate to a user that the list can be navigated using Up/Down arrows of the remote control. If the cursor is positioned over the first item in the list only a down indicator should be visible and, likewise, if the cursor is positioned over the last item in the list, only an up indicator should be visible.

However, in an optional arrangement, the list of content identifier items 244 may be arranged in a carousel manner such that there is no beginning and no end. In such an arrangement, both the up and down indicators are always visible. If the menu list or carousel is arranged in a horizontal arrangement then left and right indicators may be displayed.

Optionally, when an advertisement break begins, a first replacement advertisement content item is inserted in place of an original advertisement in the broadcast feed.

The user may opt to watch the advertisement or instruct the content receiver to invoke display of the above described menu indicating the playlist of replacement advertisements. The user can select from the menu a desired replacement advertisement for display.

Although in the above described one or more embodiments a final replacement advertisement content item is truncated in order to return to the display of a broadcast video content item, i.e. a television programme, this need not be the case.

In a content receiver which has a programme recording capability, rather than returning to the display of a television programme, a final replacement advertisement content item may be displayed in full before returning to display of the television programme. The recording facility of the content receiver is arranged to record the television programme from the end of the advertisement break until instructed to stop recording. Thus, when the final replacement advertisement content item concludes, it is not the live television programme which is displayed, but a recorded version of it.

When the final replacement advertisement content item is viewed in full, the content receiver may also offer the user the option of viewing the television programme from its current live point, i.e. an initial portion of the television programme overlapping with the final replacement advertisement content item after the end of the original advertisement break will be missed, or to watch a recorded version of the television programme as described above.

In the above described one or more embodiments, when an advertisement break begins, a playlist of replacement advertisement content items is retrieved from replacement advertisement database 1631 of the content receiver and displayed instead of the received broadcast transport stream.

The length of the advertisement break (typically three minutes) is maintained so that the viewer is returned to the live broadcast video content at the end of the advertisement break, i.e. the live broadcast video content item is displayed at conclusion of the advertisement break. This may entail truncating a final advertisement being viewed before resumption of the live broadcast video content. For example, if a viewer begins watching a 30 second advertisement 20 seconds before the content is due to resume, the final 10 seconds of the advertisement will not be displayed.

In an optional arrangement, the viewer may opt to view the entirety of the final advertisement and return to the primary content item, i.e. the broadcast video content item, either at the live point or at a point in history (this second option would only be available where the content receiver comprises a programme recording function).

In one or more embodiments of the invention, one or more content identifier items may each include one or more sub-fields. Each one or more sub-field comprising a link to further content items associated with the replacement advertisement content item to which the content identifier item in which the sub-field is located relates.

Further content items optionally comprise "long-form" versions of the replacement advertisement content items in the playlist. Thus, when a sub-field link is selected, a long-format version of the replacement advertisement content item to which the sub-field relates is displayed.

As with the replacement advertisement content items, the further content items may be stored on the replacement advertisement database 1631 in disk storage 163 of the content receiver and are accessed therefrom. However, this need not be the case, and the further content items may be stored remotely. In this case, the sub-field link comprises a link to the remote address where the further content items are stored. Upon selection of such a sub-field link, a request is sent by the content receiver to the remote location for retrieval of the selected further content item.

Optionally, a link to a further content item is displayed on screen when a replacement advertisement content item is displayed. Again, this may comprise a link to a "long-form" version of the replacement advertisement content item currently being displayed. Selection of the link invokes display of the further content item. As above, the one or more further content items may be stored locally and/or remotely.

Optionally, display of a long-form version of a replacement advertisement content item may be invoked by the content receiver upon receiving a user instruction entered via input device. This instruction may be a single key-press of a button on a remote control device.

The above one or more embodiments are to be understood as illustrative examples of the invention. Further embodiments of the invention are envisaged as follows.

In an optional arrangement, replacement advertisement content items may be inserted into breaks in the broadcast content item other than advertisement breaks. For example, if transmission of the broadcast content item fails and thus no broadcast signal is received at the content receiver, replacement advertisement content items could automatically be displayed.

In one or more embodiments of the invention, the replacement advertisement database 1631 may comprise a protected portion of disk storage 163. Only replacement advertisement content items may be stored in this portion of disk storage 163.

In one or more embodiments of the invention content distribution is via transmission over both a communications network (as either streaming video or as a progressive download) and a video distribution network (as broadcast video). The communications network may be for example the Internet or a local private network, a wireless network, or a telecommunications network such as for example General Packet Radio Service (GPRS) or a telecommunications network based on a Third Generation (3G) telecommunications standard such as for example the Universal Mobile Telecommunications System (UMTS) or Code Division Multiple Access 2000 (CDMA2000) and the distribution receiver receives the transmission via a communications network, for example a network card, or a broadband modem, or a wireless network card, or a telecommunications receiver such as a GPRS receiver or a receiver based on a Third Generation (3G) telecommunications standard such as for example the Universal Mobile Telecommunications System (UTMS) or Code Division Multiple Access 2000 (CDMA2000).

In one or more embodiments of the invention content distribution technique may be via a storage medium for example a hard disc, or an optical storage medium such as a Digital Versatile Disc (DVD) or a High Definition DVD (HD-DVD) such as a Blue Ray Disc, and the content receiver is a device for accessing the storage medium, such as a hard disc or a DVD player or an HD-DVD player.

In one or more embodiments of the invention content distribution may be via a user-recorded storage medium, such as a hard disc or a Video Home System (VHS) cassette or for example an optical storage medium such as a Digital Versatile Disc (DVD) or a High Definition DVD (HD-DVD) such as a Blue Ray Disc, and the content receiver is a device for accessing the user recorded storage medium, such as means for accessing a hard disc or a VHS cassette player or a DVD player or an HD-DVD player.

In one or more embodiments of the invention content distribution may be via a user-recorded storage medium that is internal to the content receiver.

In one or more embodiments of the invention content distribution may be via a user-recorded storage medium that is external to and coupled with the content receiver.

In one or more embodiments of the invention content distribution may be via a user-recorded storage medium at a remote location and includes transmission to the content receiver via a communications network such as for example the Internet.

In one or more embodiments of the invention content distribution may be via an analogue broadcast.

In one or more embodiments of the invention content distribution may be via a digital broadcast.

In one or more embodiments of the invention content distribution may be via terrestrial television broadcast and the content receiver is a terrestrial television receiver.

In one or more embodiments of the invention content distribution may be via satellite television broadcast and the content receiver is a satellite television receiver.

In one or more embodiments of the invention content distribution may be via cable television broadcast and the content receiver is a cable television receiver.

In one or more embodiments of the invention, the content receiver may be configured to specify its capabilities to the MDMS, for example, each time search request is invoked, and/or when a request for content is sent to the MDMS.

In one or more embodiments of the invention the content receiver may be a computer, or content stored on a computer on a home network.

In one or more embodiments of the invention the content receiver may be a mobile device such as for example a portable computer, a mobile phone or another receiver of Digital Video Broadcast for Handheld devices (DVB-H).

In one or more embodiments of the invention the content display may be a visual display unit such as a computer monitor.

In one or more embodiments of the invention the content display may be a screen embedded in a mobile device.

In one or more embodiments of the invention the content navigation module may be invoked via the user selection of a menu item displayed by the video receiver.

In one or more embodiments of the invention the content navigation module and the browser application may be components of a single computer program.

In one or more embodiments of the invention the content navigation module may be implemented as dynamically generated content presented by the content receiver, for example where the dynamically generated content is a web page in a markup language such as for example Hypertext Markup Language (HTML).

In one or more embodiments of the invention the content navigation module may be implemented as dynamically generated content presented by the browser application that is generated by a remote system and transmitted to the browser application via a communications network.

In one or more embodiments of the invention the content receiver may be able to render items of content relating to TV applications described in a markup language or other Interactive engine such as for example Hypertext Markup Language (HTML), TV Markup Language (TVML, or wTVML), Extensible HTML (XHTML), XHTML Basic, CE-HTML or another Extensible Markup Language (XML) based content description.

In one or more embodiments of the invention the browser application may be able to render content in the form of a video sequence such as for example a video received via a communications network or a video distributed via a broadcast method received by the content receiver or a video stored on a storage medium accessed by the content receiver.

In one or more embodiments of the invention the search function comprises a sub-image embedded in content.

In one or more embodiments of the invention the input device may be a keypad on a mobile device, for example a keypad on a mobile phone.

In one or more embodiments of the invention the link to content may be a Universal Resource Identifier (URI).

In one or more embodiments of the invention the link to content may direct the content receiver to access content that is for example a video sequence that is for example received via a communications network or distributed via a broadcast method or stored on a storage medium, or a TV application capable of being accessed via an interactive content engine installed on the device.

In one or more embodiments of the invention, the links to content may be paid-for interactive or video advertisements.

In one or more embodiments of the invention the content output component may be able to present a video sequence decoded by the video decoder in one portion of the video display and graphics produced by programs running on the graphics processor in another portion of the display.

In one or more embodiments of the invention the content output component may be able to present graphics produced by programs running on the graphics processor that consume the entire display.

In one or more embodiments of the invention the content output component produces an analogue computer display signal such as a Video Graphics Array (VGA) signal.

In one or more embodiments of the invention the video output component produces a digital display signal such as a Digital Visual Interface (DVI) signal.

In one or more embodiments of the invention the video output component produces a high-definition digital display signal such as a High-Definition Multimedia Interface (HDMI) signal.

It will be appreciated that the term "playback" is intended to refer to the display of live video content such as a live sporting event as well as recorded video content.

It is to be understood that any feature described in relation to any one embodiment may be used alone, or in combination with other features described, and may also be used in combination with one or more features of any other of the embodiments, or any combination of any other of the embodiments.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analogue media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory. The computer program may be supplied from a remote source embodied in the communications medium such as an electronic signal, radio frequency carrier wave or optical carrier waves. Such carrier media are also envisaged as aspects of the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A method of operating a content item receiver using a CPU and a software program, said method comprising:
    in a first mode driving a display apparatus to display a received content item;
    in a second mode driving for a specified time window said display apparatus to display a plurality of linked content items in sequence in said specified time window, each of said linked content items having a duration less than said specified time window, and having a corresponding content item identifier, wherein all content item identifiers for the plurality of linked content items are concurrently displayed on the display apparatus, and to automatically respond to a prompt signal displayed on the display apparatus to initiate a display of a menu of one or more display options, said menu comprising a plurality of a content item identifiers corresponding to a plurality of long form content items and a further display option; wherein said further display option comprises at least one further content item identifier corresponding to a further long form content item and a yet further display option;
    further comprising prompting a viewer to select an option to continue display of a selected long form or further long form content item beyond a finish of said specified time window; and
    in response to user selection, initiating display on said display apparatus of said long form content item or said further display option.

2. A method according to claim 1, further comprising responding to said prompt signal in said second mode to initiate display on said display apparatus of a long form content item associated with one or more linked content items of said sequence said long form content item having a greater duration than at least one of said associated linked content items.

3. A method according to claim 1, wherein said long form content item and/or said further long form content item includes subject-matter related to the subject-matter of said associated one or more linked content items of said sequence of linked content items.

4. A method according to claim 1, further comprising truncating a selected long form or further long form content item to finish display of said selected long form or further long form content item coincident with a finish of said specified time window.

5. A method according to claim 3, wherein said included subject-matter is related to the subject-matter of a linked content item displayed on said display apparatus when said prompt signal is initiated.

6. A method according to claim 5, wherein said further long form content item includes subject-matter related to the subject matter of said long form content item.

7. A method according to claim 5, further comprising retrieving said long form content item and/or said further long form content item from a local store.

8. A method according to claim 5, further comprising retrieving network location information from a local store for said long form content item or said further long form content item from a local store.

9. A method according to claim 6, wherein said one or more display options and/or said further display option is associated with one or more linked content items of said sequence of linked content items.

10. A method according to claim 8, wherein said network location information comprises a uniform resource locator (url).

11. A method according to claim 7, further comprising requesting and/or receiving said long form content item and/or said further long form content item from a source located on a network and storing said long form content item and/or said further long form content item to said local store.

12. A method according to claim 8, further comprising requesting and/or receiving said network location information from a source located on a network and storing said network location information to said local store.

13. A method according to claim 9, further comprising initiating display on said display apparatus of a first linked content item of said sequence of linked content items responsive to initiation of said specified time window.

14. A method according to claim 12, further comprising said local store for said long form content item and/or said further long form content item and/or said network location information.

15. A method of operating a content item delivery system server, comprising providing said long form content item and/or said further long form content item and/or said network location information to a content item receiver module operating in accordance with a method according to claim 12.

16. A method according to claim 13, further comprising responding to a user generated prompt signal to initiate display of said one or more display options.

17. A method according to claim 13, further comprising respond to a prompt signal generated automatically responsive to initiation of said specified time window.

18. A method according to claim 17, further comprising initiating said display of said one or more display options superimposed over a currently displayed content item.

19. A method according to claim 18, further comprising partially transparently superimposing said display options.

20. A method according to claim 19, wherein respective ones of said display options comprise an image representative of a respective display option.

21. A content item receiver device operative for a content item delivery system, configured to operate in a first and second mode:
said first mode operative to drive a display apparatus to display a received content item;
said second mode operative for a specified time window to display on a display apparatus a plurality of linked content items in sequence in said specified time window, each of said linked content items having a duration less than said specified time window, and having a corresponding content item identifier, wherein all content item identifiers for the plurality of linked content items are concurrently displayed on the display apparatus, and to automatically respond to a prompt signal displayed on the display apparatus to initiate a display of a menu of one or more display options, said menu comprising a plurality of a content item identifier corresponding to a plurality of long form content items and a further display option, wherein said further display option comprises at least one further content item identifier corresponding to a further long form content item and a yet further display option; further configured to prompt a viewer to select an option from the one of more options to continue display of a selected long form or further long form content item beyond a finish of said specified time window; and further configured to initiate in response to user selection display on said display apparatus of said long form content item or said further display option.

22. A content item receiver device according to claim 21, further configured to operate in said second mode to respond to said prompt signal to initiate display on said display apparatus of a long form content item associated with one or more linked content items of said sequence said long form content item having a greater duration than at least one of said associated linked content items.

23. A content item receiver device according to claim 21, wherein said long form content item and/or said further long form content item includes subject-matter related to the subject-matter of said associated one or more linked content items of said sequence of linked content items.

24. A content item receiver device according to claim 21, further configured to truncate a selected long form or further long form content item to finish display of said selected long form or further long form content item coincident with a finish of said specified time window.

25. A content item receiver device according to claim 21, further configured to retrieve said long form content item and/or said further long form content item from a local store.

26. A content item receiver device according to claim 21, further configured to retrieve network location information for said long form content item or said further long form content item from a local store.

27. A content item receiver device according to claim 23, wherein said included subject-matter is related to the subject-matter of a linked content item displayed on said display apparatus when said prompt signal is initiated.

28. A content item receiver device according to claim 26, wherein said network location information comprises a uniform resource locator (url).

29. A content item receiver device according to claim 25, further configured to request and/or receive said long form content item and/or said further long form content item from a source located on a network and store said long form content item and/or said further long form content item local to said content item receiver module.

30. A content item receiver device according to claim 26, further configured to request and/or receive said network location information from a source located on a network and store said network location information local to said content item receiver module.

31. A content item receiver device according to claim 27, wherein said further long form content item includes subject-matter related to the subject matter of said long form content item.

32. A content item receiver device according to claim 31, wherein said one or more display options and/or said further display option is associated with one or more linked content items of said sequence of linked content items.

33. A content item receiver device according to claim 32, further configured to initiate display on said display apparatus of a first linked content item of said sequence of linked content items responsive to initiation of said specified time window.

34. A content item receiver device according to claim 33, further configured to be responsive to a prompt signal generated automatically responsive to initiation of said specified time window.

35. A content item receiver device according to claim 33, further configured to be responsive to a user generated prompt signal to initiate display of said one or more display options.

36. A content item receiver device according to claim 34, further configured to initiate said display of said one or more display options superimposed over a currently displayed content item.

37. A content item receiver device according to claim 36, further configured to partially transparently superimpose said display options.

38. A content item receiver device according to claim 37, wherein respective ones of said display options comprise an image representative of a respective display option.

\* \* \* \* \*